US008289735B2

(12) United States Patent  
Limpaecher et al.

(10) Patent No.: US 8,289,735 B2
(45) Date of Patent: *Oct. 16, 2012

(54) METHOD AND SYSTEM FOR DELIVERING A CONTROLLED VOLTAGE

(75) Inventors: Rudolf Limpaecher, Sarasota, FL (US); Alex Wilhelm Limpaecher, Topsfield, MA (US)

(73) Assignee: Varentec LLC, North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,319

(22) Filed: Jul. 7, 2011

(65) Prior Publication Data

US 2011/0261595 A1    Oct. 27, 2011

Related U.S. Application Data

(63) Continuation of application No. 12/723,878, filed on Mar. 15, 2010, now Pat. No. 8,000,118.

(51) Int. Cl.
*H02M 5/257* (2006.01)
*H02M 3/315* (2006.01)

(52) U.S. Cl. ............. 363/27; 363/60; 363/135; 363/160

(58) Field of Classification Search .................... 363/15, 363/27, 28, 60, 95, 96, 123, 135, 160
See application file for complete search history.

(56) References Cited

U.S. PATENT DOCUMENTS

| 4,811,187 | A | 3/1989 | Nakajima et al. |
|---|---|---|---|
| 5,047,911 | A | 9/1991 | Sperzel et al. |
| 5,930,123 | A | 7/1999 | Kammiller |
| 6,018,469 | A | 1/2000 | Poon |
| 6,118,678 | A | 9/2000 | Limpaecher et al. |
| 6,492,878 | B1 | 12/2002 | Rim et al. |
| 6,594,159 | B2 | 7/2003 | Schlecht |
| 7,012,817 | B2 | 3/2006 | Liu et al. |
| 7,061,778 | B2 | 6/2006 | Odell et al. |
| 2004/0042237 | A1 | 3/2004 | Hsieh |
| 2004/0070997 | A1 | 4/2004 | Hung |
| 2008/0192516 | A1* | 8/2008 | Morbe et al. .............. 363/49 |
| 2008/0212341 | A1 | 9/2008 | Moiseev |

FOREIGN PATENT DOCUMENTS

JP    05030738 A    2/1993

OTHER PUBLICATIONS

Biela, J.; Bortis, D.; Kolar, J.W., "Reset Circuits With Energy Recovery for Solid-State Modulators," Plasma Science, IEEE Transactions on, vol. 36, No. 5, pp. 2626-2631, Oct. 2008, doi: 10.1109/TPS.2008.2005265, URL: http://ieeexplore.ieee.org/stamp/stamp.jsp?tp=&arnumber=4675220&isnumber=4675197.*

International Search Report for PCT/US2011/028039 dated Oct. 21, 2011 (3 pages).

* cited by examiner

*Primary Examiner* — Adolf Berhane
*Assistant Examiner* — Fred E Finch, III
(74) *Attorney, Agent, or Firm* — Osha Liang LLP

(57) ABSTRACT

In general, in one aspect, the invention relates to a method for delivering a controlled voltage. The method involves, during a first electric pulse delivered to a primary transformer, holding a first switching section open to isolate the controlled voltage, where the first electric pulse creates a first magnetic flux in a core of the primary transformer, and where the first magnetic flux generates a direct current (DC) magnetizing current. The method further involves receiving the controlled voltage from a voltage source using the DC magnetizing current at a first switching section, and upon termination of the first electric pulse, closing the first switching section to deliver the controlled voltage to the primary transformer.

17 Claims, 17 Drawing Sheets

US 8,289,735 B2

METHOD AND SYSTEM FOR DELIVERING A CONTROLLED VOLTAGE

CROSS-REFERENCE TO RELATED APPLICATIONS

This application is a continuation of U.S. patent application Ser. No. 12/723,878, filed on Mar. 15, 2010, and entitled: "METHOD AND SYSTEM FOR DELIVERING A CONTROLLED VOLTAGE." Accordingly, this application claims benefit of the filing date of U.S. patent application Ser. No. 12/723,878 under 35 U.S.C. §120. U.S. patent application Ser. No. 12/723,878 is hereby incorporated in its entirety.

BACKGROUND

Transformers, inverters, converters, and similar charge transfer devices with solid state technology are used to offer reduced size and increased efficiency compared to more traditional charge transfer devices. With traditional configurations of a charge transfer device, there is symmetry. In other words, there is an electrical push-pull, alternating between each electric pulse delivered by the primary side of the charge transfer device, where the magnetic flux in the core of the charge transfer device (e.g., a transformer) alternates between a positive component and a negative component. Such an alternating magnetic flux between a positive and negative component prevents the core of the charge transfer device from saturating.

With solid state devices, a symmetric configuration requires a duplication of switches, windings, and other related equipment, one for the positive electric pulse and one for the negative electric pulse. Such duplication may increase the cost to produce a charge transfer device using solid state technology. Other configurations may exist using solid state devices, but each of the other configurations create disadvantages relative to the symmetric configuration that need to be taken into consideration. These disadvantages may be related to cost, performance, longevity, some other aspect of the charge transfer device, or any combination thereof.

SUMMARY

In general, in one aspect, the invention relates to a method for delivering a controlled voltage. The method involves, during a first electric pulse delivered to a primary transformer, holding a first switching section open to isolate the controlled voltage, where the first electric pulse creates a first magnetic flux in a core of the primary transformer, and where the first magnetic flux generates a direct current (DC) magnetizing current. The method further involves receiving the controlled voltage from a voltage source using the DC magnetizing current at a first switching section, and upon termination of the first electric pulse, closing the first switching section to deliver the controlled voltage to the primary transformer.

In general, in one aspect, the invention relates to a system for delivering a controlled voltage. The system includes a voltage source configured to provide a controlled voltage. The system also includes a first secondary winding configured to receive a first electric pulse from an input module comprising a primary transformer, where the first electric pulse creates a first magnetic flux in a core of the primary transformer, and where the first magnetic flux generates a first direct current (DC) magnetizing current. The first secondary winding of the system is also configured to receive a second electric pulse from the input module comprising the primary transformer, where the second electric pulse creates a second magnetic flux in the core of the primary transformer, and where the second magnetic flux generates a second DC magnetizing current, where the first electric pulse and the second electric pulse are have the same polarity. The system also includes a first switching section configured to receive the controlled voltage from the voltage source and to deliver the controlled voltage to the primary transformer through the first secondary winding when the first electric pulse terminates. The system also includes a control unit configured to control the first switching section.

Other aspects of the invention will be apparent from the following description and the appended claims.

DETAILED DESCRIPTION

Figure 1:
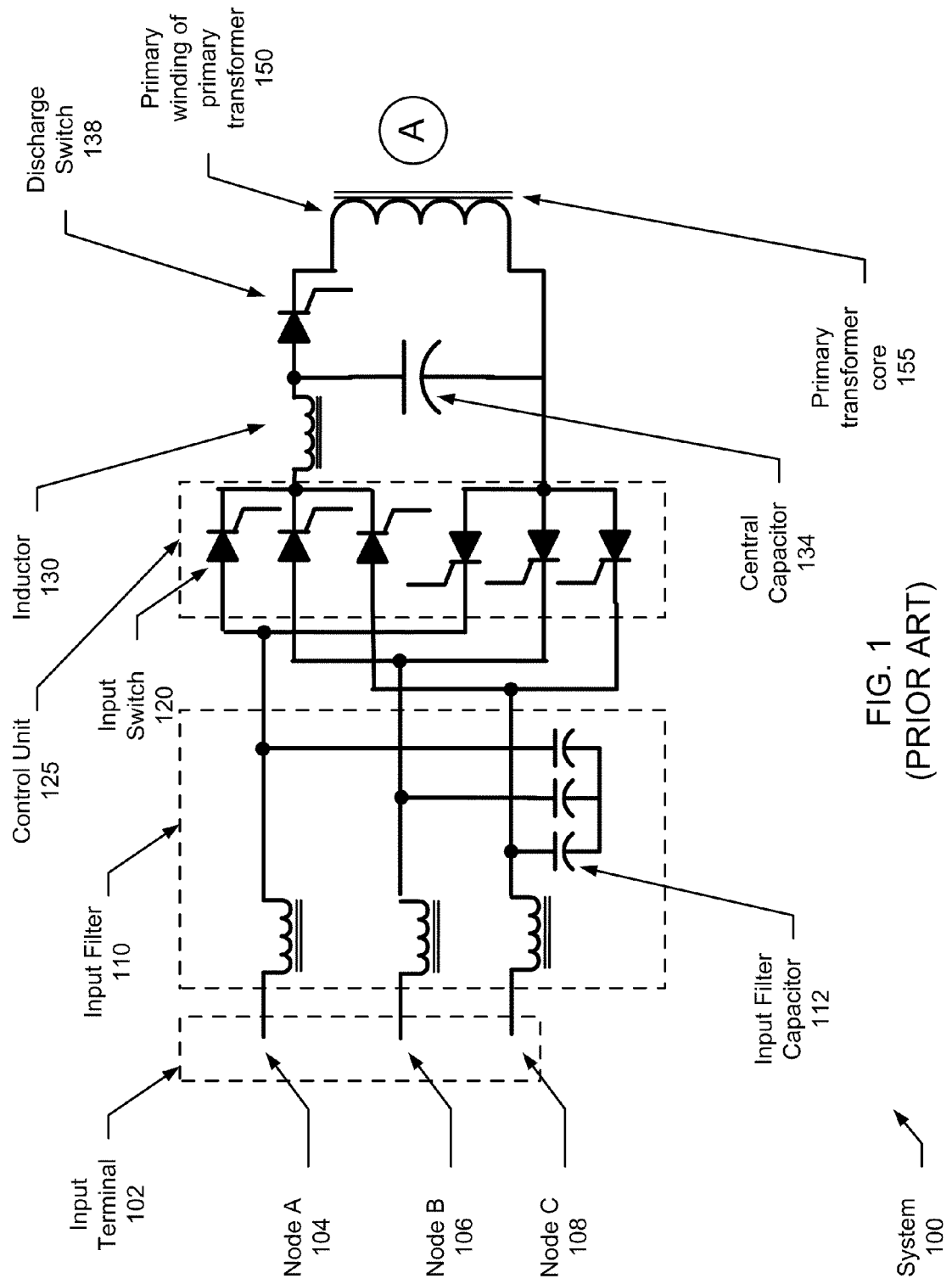
FIG. 1 shows a single line diagram of a system showing a portion of a charge transfer device known in the art.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for a method and system for delivering a controlled voltage. More specifically, one or more embodiments of the invention provide a method and system for asymmetric conversion in transferring electric charge in a solid state device. Further, one or more embodiments of the invention provide a method and system for asymmetric conversion where the core magnetic flux of the transformer is controlled, thereby reducing the magnetic flux to prevent saturation of the transformer core. Preventing saturation in a transformer core is accomplished by applying a controlled voltage to a transformer winding using a core flux reset control circuit, according to one or more embodiments of the invention.

FIG. 1 shows a single line diagram of a system showing a portion of a charge transfer device (also called a conversion device) (e.g., input module) with an asymmetric configuration in accordance with one or more embodiments of the invention. Specifically, FIG. 1 shows a primary side with an asymmetric solid state configuration of a transformer in accordance with one or more embodiments of the invention. The system (100) includes an input terminal (102), an input filter (110), a number of input switches (e.g., input switch (120)), a control unit (125), an inductor (130), a central capacitor (134), a discharge switch (138), a primary winding (150), and a primary transformer core (155). The input terminal (102) includes one or more nodes (e.g., node A (104), node B (106), and node C (108)).

Figure 2:
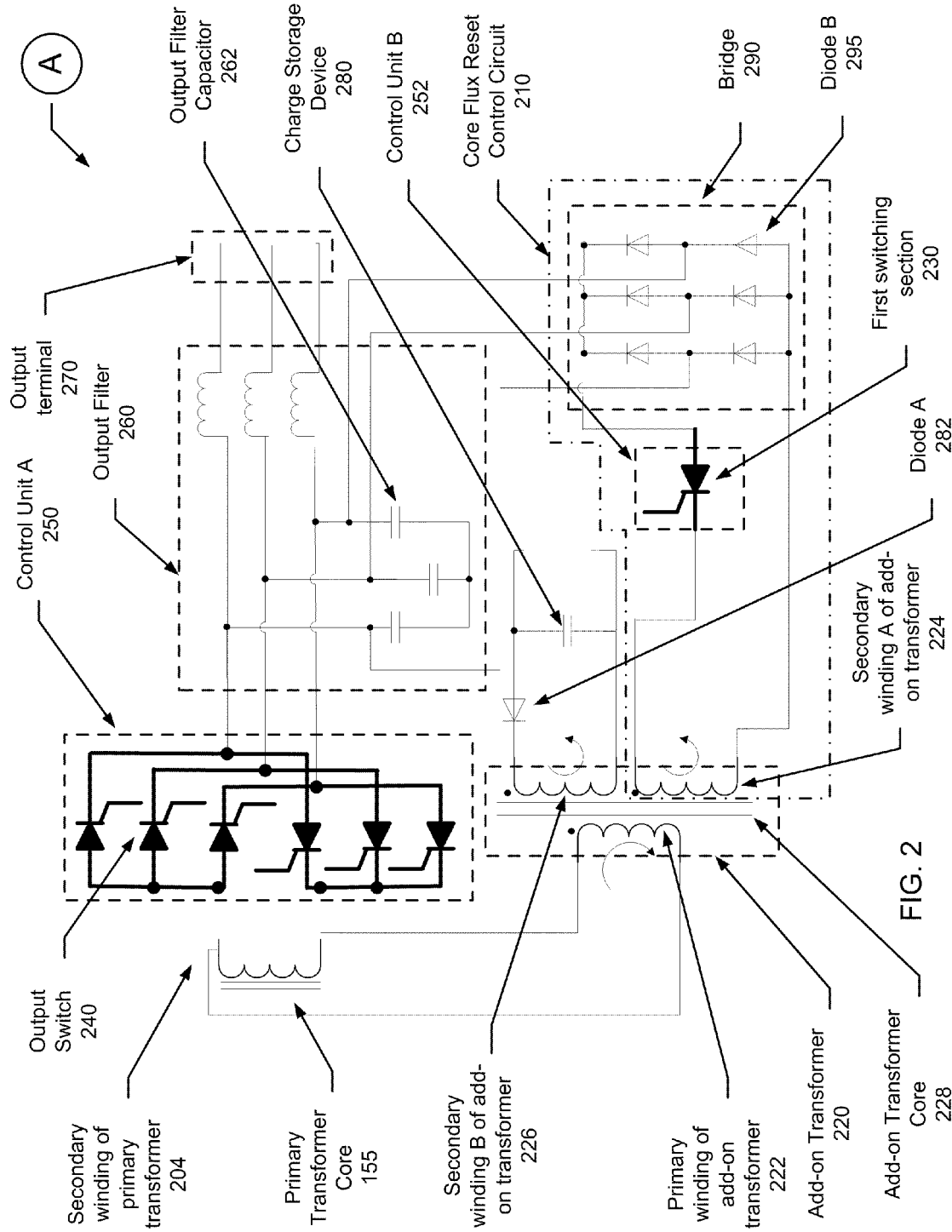
FIGS. 2-4C each show single line diagrams of a system in accordance with one or more embodiments of the invention.

The input filter (110) includes a one or more inductors and one or more input filter capacitors (e.g., input filter capacitor (112)). Each of these components is described below. One of ordinary skill in the art will appreciate that embodiments of the invention are not limited to the configuration shown in FIG. 1. For example, FIG. 1 shows a configuration for converting alternating current (AC) power. The system of FIG. 1 may be modified to accept direct current (DC) power. FIGS. 2 and 4 (and FIG. 3 by extension of FIG. 2) show the secondary side of the charge transfer device, which may also be configured to accept AC or DC power. Thus, configurations of the charge transfer device may exist for AC-to-DC transformation (also called inversion), DC-to-AC transformation (also called conversion), AC-to-AC transformation, and DC-to-DC transformation.

In one or more embodiments of the invention, an input module may be any charge transfer device or similar apparatus capable of providing one or more voltage interfaces to a core flux reset control circuit, as described below with respect to, for example, FIGS. 2-4. The input module may also include supporting components of a charge transfer device or similar apparatus. Such supporting components may include, but are not limited to, input and/or output switches, input and/or output filter capacitors, an inductor, a discharge switch, a central capacitor, all as described below with respect to FIGS. 1 and 2. Specifically, an input module may be a charging circuit that includes one or more of the supporting components discussed above in conjunction with a charge transfer device. Another example of an input module may include an add-on transformer, as described below with respect to FIGS. 2 and 3.

In one or more embodiments of the invention, the input terminal (102) is configured receive power from a source. The input terminal (102) may include one or more nodes (e.g., node A (104), node B (106), and node C (108)). A voltage may be applied to each node, and the voltage applied to each node may vary with time and vary between nodes at the same time. In this example, there are three nodes, namely node A (104), node B (106), and node C (108), in the input terminal (102). Each node in the input terminal (102) may represent a phase of an AC or DC circuit. Those skilled in the art will appreciate that other configurations may exist with respect to the nodes of the input terminal (102). For example, one of the nodes may be ground. The source of an input terminal (102) may be, for example, a generator, a load, a distribution line, a transmission line, a storage device, or any other suitable source. In one or more embodiments of the invention, more than one input terminal (102) exists for a single transformer and/or charge transfer device. There may also be more than one primary winding (i.e., a multi-port configuration) for a single transformer and/or charge transfer device.

In one or more embodiments of the invention, the input filter (110) includes a number of inductors and input filter capacitors (e.g., input filter capacitor (112)), where each node (e.g., node A (104), node B (106), and node C (108)) of the input terminal (102) has an inductor and an input filter capacitor (e.g., input filter capacitor (112)). The combination of inductors and input filter capacitors (e.g., input filter capacitor (112)) may be in a "L-C" or "delta" configuration. The combination of inductors and input filter capacitors (e.g., input filter capacitor (112)) may also be a "Y" configuration as shown in FIG. 1. Those skilled in the art will appreciate that other configurations may also be used. In one or more embodiments of the invention, the size/capacity of the inductors and input filter capacitors (e.g., input filter capacitor (112)) vary. Each of the input filter capacitors (e.g., input filter capacitor (112)) may hold the charge associated with the source injecting charge at a particular node of the input terminal (102). Further, each of the input filter capacitors, once charged, may release its charge (i.e., discharge) to charge the central capacitor (134).

In one or more embodiments of the invention, the input switches (e.g., input switch (120)) are configured to regulate the charge that flows to the central capacitor (134). The input switches may also be configured to regulate the charge transfer using one or more input filter capacitors (e.g., input filter capacitor (112)). Specifically, the input switches may be configured to regulate the amount of charge from each of, or between, the nodes of the input terminal (102) that flows through the central capacitor (134) at a point in time and/or on a pulse-to-pulse basis. In one or more embodiments, each input switch (e.g., input switch (120)) is configured to allow an electric pulse to flow in only one direction, giving each input switch (e.g., input switch (120)) a polarity. Further, an input switch (e.g., input switch (120)) configured to allow flow from the input terminal (102) to the central capacitor (134) may be called a positive input switch. An input switch (e.g., input switch (120)) configured to allow flow from the central capacitor (134) to the input terminal (102) may be called a negative input switch. At least one positive input switch and at least one negative input switch associated with each node of the input terminal (102) may exist in a single system or charge transfer device.

Each of the input switches may be an actual switch, a switching module, or any other suitable switch assembly. The input switches may be controlled by a control unit (125) (described below). Specifically, the control unit (125) may control when each of the input switches open and/or close. Each input switch (e.g., input switch (120)) may be, for example, a conventional thyristor. As another example, at higher operating frequencies (e.g., greater than 2 kHz), each input switch (e.g., input switch (120)) may be an insulated gate bipolar transistor (IGBT), which may be coupled with a diode to establish the polarity. While the central capacitor (134) is charging, one or more input switches (e.g., input switch (120)) may close while one or more other switches (e.g., input switch (120)) may open. Each input switch may also be, but is not limited to, a diode, an integrated gate-commutated thyristors (IGCTs), or a silicon controlled thyristors (SCRs). This switching may be done using soft switching methods. In other words, a switch may change state from open to closed (i.e., from conducting to none conducting) or be configured in such a way so as to divert current flow in a desired direction (e.g., away from an already closed switch). Rather than open the already closed switch at the same time that the open switch is being closed, the already closed switch may remain closed for some period of time after the open switch is closed or at the occurrence of some predetermined event. For example, the previously closed switch may open automatically when a negative current (inductive current), created when the new switch is closed, is applied to the previously closed switch. An example of soft switching is described below with respect to FIG. 7D.

In one or more embodiments of the invention, the control unit (125) is configured to open and/or close each of the input switches, the discharge switch (138), and/or other switches requiring control. The control unit (125) may include measurement instruments, such as voltage monitors and/or current monitors, the readings from which may be used to control when certain switches are directed to change state. The control unit (125) may also use these other measurement instruments to determine when an input switch should be opened and/or closed. For example, the control unit (125) may be configured to detect the beginning and/or end of an electric pulse delivered to the primary transformer winding (150). The control unit (125) may rely upon a separate power source.e.g., power supplied by a source other than directly from the input terminal (102)). The control unit (125) may require AC power or DC power. The control unit may be a computer or controlled by a computing device. A computer or computing device may be, for example, a digital signal processor (DSP), a programmable logic device (such as a field programmable gate array (FPGA)), or a programmable logic controller (PLC). Additional embodiments of the computing device are described below with respect to FIG. 8.

In one or more embodiments of the invention, the inductor (130) is a passive electrical component configured to influence the charge flowing from the input switches (e.g., input switch (120)) to the central capacitor (134). Specifically, the inductor (130) may be configured to store energy in a magnetic field created by an electric current passing though it. In one or more embodiments of the invention, the central capacitor (134) is configured to store the charge that flows through the input switches. While charging, the central capacitor (134) may also be configured to allow some of the charge to flow through it, through a negative input switch (e.g., input switch (120)), and through one or more input filter capacitors (e.g., input filter capacitor (112)) to complete a circuit. The central capacitor (134) may also be configured to release the stored charge to the primary winding of the primary transformer (150) through the discharge switch (138). In one or more embodiments of the invention, the discharge switch (138) is configured to regulate the amount of charge that flows from the central capacitor (134) to the primary winding of the primary transformer (150). An example of this process is described below with respect to Example 1.

In one or more embodiments of the invention, the primary winding of the primary transformer (150) is configured to receive the charge flowing through the discharge switch (138). The control unit (125) may close the discharge switch (138) to allow charge to flow from the central capacitor (134). In one or more embodiments of the invention, the primary winding of the primary transformer (150) is a form of an inductor. The primary winding of the primary transformer (150) may be a wire wrapped around the primary transformer core (155). More than one primary winding of the primary transformer (150) may exist for the primary transformer core (155). In one or more embodiments of the invention, the primary transformer core (155) builds magnetic flux as a result of each charge (e.g., electric pulse) received by the central capacitor (134). The amount of magnetic flux that accumulates in the transformer core (155) from each electric pulse may vary. The magnetic flux that accumulates in the primary transformer core (155) may generate a DC magnetizing current (described below).

In one or more embodiments of the invention, a secondary transformer winding (shown below with respect to FIG. 2), which is a different wire wrapped around the same primary transformer core (155) as the primary transformer winding, exists. The characteristics of the charge flowing into the transformer and the charge flowing out of the transformer may depend on a number of factors, including but not limited to a material of the wires (e.g., primary winding of the primary transformer (150)) and/or the primary transformer core (155), the number of times each wire (e.g., primary winding of the primary transformer (150)) is wrapped around the primary transformer core (155), a diameter of each wire (e.g., primary winding of the primary transformer (150)), and a size and/or shape of the primary transformer core (155).

FIGS. 2 and 4A-4C (and FIG. 3 by extension of FIG. 2) each show a single line diagram of a system in accordance with one or more embodiments of the invention. Specifically, FIGS. 2-4C each show a secondary side of the charge transfer device, as described above with respect to FIG. 1. Semicircular arrows in proximity to transformer windings in FIG. 2-4C show flow of current through the transformer winding. A dot at one end of a transformer winding in FIGS. 2-4C show the polarity of the transformer winding. One of ordinary skill in the art will appreciate that embodiments of the invention are not limited to the configurations shown in FIGS. 2-4C. In one or more embodiments of the invention, the core flux reset control circuit shown in FIGS. 2-4C is galvanically isolated from the secondary winding of the transformer from which it receives a charge for use in providing a controlled voltage to the transformer. As with the configuration described in FIG. 1, in one or more embodiments of the invention, more than one output terminal may exist for a single transformer and/or charge transfer device. There may also be more than one secondary winding (i.e., a multi-port configuration) for a single transformer and/or charge transfer device.

FIG. 2 shows a single line diagram of the secondary side of the charge transfer device with an asymmetric solid state configuration. In one or more embodiment of the invention, the system includes a primary transformer core (155), a secondary winding of the primary transformer (204), an add-on transformer (220), a core flux reset control circuit (210), an output switch(es) (e.g., output switch (240)), control unit A (250), an output filter (260), an output terminal (270), and, optionally, a charge storage device (280). In one or more embodiment of the invention, the core flux reset control circuit (210) includes secondary winding A of the add-on transformer (224), a first switching section (230), control unit B (252), and a bridge (290). In one or more embodiment of the invention, the add-on transformer (220) includes a primary winding of the add-on transformer (222), secondary winding A of the add-on transformer (224), an add-on transformer core (228), and optionally secondary winding B of the add-on transformer (226). The output filter (260) includes one or more inductors and one or more output filter capacitors (e.g., output filter capacitor (262)). The bridge (290) of the core flux reset control circuit (210) includes one or more diodes (e.g., diode B (295)). Each of these components is described below. In one or more embodiment of the invention, the system described in FIG. 2 may be configured to control the magnetic flux in the add-on transformer (316) (which is translated to the primary transformer) between $-\Phi$ and zero, or between zero and $+\Phi$.

In one or more embodiments of the invention, the secondary winding of the primary transformer (204) is a wire wrapped around the primary transformer core (155). The primary transformer core (155) may be the same as the primary transformer core as described above with respect to FIG. 1. The primary transformer core (155) may also have wrapped around it a different wire, known as the primary winding of the primary transformer (not shown, but as described above with respect to FIG. 1). Electric energy flows through the primary winding of the primary transformer, inducing a magnetic flux in the primary transformer core (155). The magnetic flux in the primary transformer core (155) then induces a different voltage in the secondary winding of the primary transformer (204). Also, the characteristics of the secondary winding of the primary transformer (204) may be substantially similar to those of the primary transformer winding described with respect to FIG. 1 above. In one or more embodiments of the invention, the secondary winding of the primary transformer (204) is configured to deliver an electric charge to one or more of the output switches (e.g., output switch (240)) and, optionally, to the primary winding of the add-on transformer (222).

In one or more embodiments of the invention, the output switches (e.g., output switch (240)) are configured to regulate the electric charge that flows to the output filter capacitors (e.g., output filter capacitor (262)) of the output filter (260) and the output terminal (270). The characteristics of the output switches (e.g., output switch (240)) may be substantially similar to those of the input switches described above with respect to FIG. 1. Each of the output switches (e.g., output switch (240)) may be configured to allow electric charge to flow in only one direction. An output switch (e.g., output switch (240)) configured to allow electric charge to flow from the secondary winding of the primary transformer (204) to the output terminal (270) may be called a positive output switch. An output switch (e.g., output switch (240)) configured to allow electric charge to flow from the output terminal (270) to the secondary winding of the primary transformer (204) may be called a positive output switch.

In one or more embodiments of the invention, control unit A (250) is configured to open and/or close each of the output switches (e.g., output switch (240)) and/or other switches requiring control. Control unit A (250) may include measurement instruments, such as voltage monitors and/or current monitors, the readings from which may be used to control when certain switches are directed to change state. Control unit A (250) may rely on any of a number of internal or external power sources. Control unit A (250) may require AC power or DC power. Control unit A (250) may be the same as the control unit described above with respect to FIG. 1.

In one or more embodiments of the invention, each of the output filter capacitors (e.g., output filter capacitor (262)) is configured to provide the charge (e.g., a voltage source) for delivering a controlled voltage to the core flux reset control circuit (210). The output filter capacitors may also be configured to absorb and/or provide (i.e., discharge) electric charge for a voltage source delivering the controlled voltage from the core flux reset control circuit (210). The voltage provided by the output filter capacitors may be AC or DC voltage. Further, the voltage provided by the output filter capacitors (e.g., output filter capacitor (262)) may flow to the bridge (290) of the core flux reset control circuit (210).

In one or more embodiments of the invention, core flux reset control circuit (210) is configured to deliver a controlled voltage source to the primary transformer to control and/or reduce the magnetic flux in the primary transformer core (155). Because the primary winding of the add-on transformer (222) is coupled to (i.e., is an extension of) the secondary winding of the primary transformer (204), an effect imposed by the core flux reset control circuit (210) on the add-on transformer (220) is also imposed on the primary transformer. The core flux reset control circuit (210) may also be configured to recover residual core energy from the magnetic core during the transformation process of the primary transformer. Secondary winding A of the add-on transformer (224) of the core flux reset control circuit (210) is configured to receive the controlled voltage and induce the control and/or reduction of the magnetic flux in the add-on transformer core (228), which is further induced in the primary transformer core (155) through the secondary winding of the primary transformer (204). In one or more embodiments of the invention, one end of secondary winding A of the add-on transformer (224) is coupled to the bridge (290), and the other end of secondary winding A of the add-on transformer (224) is coupled to the first switching section (230). The polarity of secondary winding A of the add-on transformer (224) may require current to flow through the bridge (290) and receive current from the first switching section (230).

In one or more embodiments of the invention, the bridge (290) is an active solid-state circuit. The bridge (290) of the core flux reset control circuit (210) may be configured to convert DC voltage to AC voltage. The bridge (290) may also be configured to convert AC voltage to DC voltage. The bridge (290) may include a number of diodes (e.g., diode B (295)). The bridge (290) may also include a number of other switching devices including, but not limited to, thyristors, IGBTs, and integrated gate-commutated thyristors (IGCTs). In one or more embodiments of the invention, if the add-on transformer (220) induces DC voltage in secondary winding A of the add-on transformer (224), then the bridge (290) is eliminated or bypassed because the voltage is already DC.

In one or more embodiments of the invention, the first switching section (230) when closed is configured to allow electric charge to flow from the bridge (290) to secondary winding A of the add-on transformer (224). The characteristics of the first switching section (230) may be substantially similar to those of one or more output switches (e.g., output switch (240)) as well as those of one or more input switches described above with respect to FIG. 1. In one or more embodiments of the invention, control unit B (252) is configured to open and/or close the first switching section (230) and/or other switches requiring control. Control unit B (252) may include measurement instruments, such as voltage monitors and/or current monitors, the readings from which may be used to control when certain switches are directed to change state. Control unit B (252) may rely on one or more internal or external power sources. Control unit B (252) may require AC power or DC power. Control unit B (252) may be the same control unit as control unit A (250) described above.

In one or more embodiments of the invention, the primary winding of the add-on transformer (222) is configured to apply voltage from the secondary winding of the primary transformer (204) to the add-on transformer (220). As described above with respect to FIG. 1, the primary transformer core (155) may induce magnetic flux from the charge received by each electric pulse delivered by the central capacitor. The magnetic flux in the primary transformer core (155) may generate a DC magnetizing current. The general description and characteristics of the primary winding of the add-on transformer (222) may be substantially similar to those of the secondary winding of the primary transformer (204). The primary winding of the add-on transformer (222) may also be an additional winding of the secondary winding of the primary transformer (204).

In one or more embodiments of the invention, the secondary winding of the primary transformer (204) is configured to receive the DC magnetizing current from the primary transformer core (155). The secondary winding of the primary transformer (204) may then transfer the DC magnetizing current from the primary transformer core (155) to the primary winding of the add-on transformer (222), which is wound around the add-on transformer core (228). The general description and characteristics of the add-on transformer core (228) may be substantially similar to the primary transformer core (155) described above with respect to FIG. 1. Likewise, the general description and characteristics of the primary winding of the add-on transformer (222) may be substantially similar to the primary winding of the primary transformer (150) described above with respect to FIG. 1.

In one or more embodiments of the invention, the DC magnetizing current drawn from the primary transformer core (155) is transformed to a different DC magnetizing current drawn from the add-on transformer core (228) using secondary winding A of the add-on transformer (224), which is wound around the add-on transformer core (228). The amperage of the DC magnetizing current in secondary winding A of the add-on transformer (224) relative to the amperage of the DC magnetizing current drawn from the primary transformer core (155) may vary depending on a number of factors, including characteristics of the add-on transformer (224) and the primary transformer. The DC magnetizing current drawn from the add-on transformer core (228) may flow from secondary winding A of the add-on transformer (224) to the bridge (290).

In one or more embodiments of the invention, the output terminal (270) is configured deliver power to a source. The output terminal (270) may include one or more nodes (not shown). A voltage may be applied to each node of the output terminal (270), and the voltage applied to each node of the output terminal (270) may vary with time or may vary between nodes at the same time. Referring to FIG. 2, there are three nodes in the output terminal (270). Each node in the output terminal (270) may represent a phase of an AC or DC circuit. Those skilled in the art will appreciate that other configurations may exist with respect to the nodes of the output terminal (270). For example, one of the nodes of the output terminal (270) may be ground. The source connected to the output terminal (270) may be, for example, a generator, a load, a distribution line, a transmission line, a storage device, or any other suitable source. In one or more embodiments of the invention, more than one output terminal (270) exists for a single transformer and/or charge transfer device.

Optionally, in one or more embodiments of the invention, secondary winding B of the add-on transformer (226) is also wound around the add-on transformer core (228). In one or more embodiments of the invention, the charge induced by secondary winding B of the add-on transformer (226) is sent to a charge storage device (280), which is also in series with diode A (282), before returning to secondary winding B of the add-on transformer (226). In one or more embodiments of the invention, the charge storage device (280) is configured to store electric charge which, when discharged, is used to provide power to various control devices through out the system, including but not limited to control unit A (250), control unit B (252), a fan to cool one or more components in the charge transfer device, lighting within the device (such as for a digital display), the control unit described with respect to FIG. 1 above, or any other component or process of the charge transfer device requiring control power. Diode A (282) may allow electric current to flow in only one direction and prevent the electric current from flowing in the opposite direction.

Figure 3:
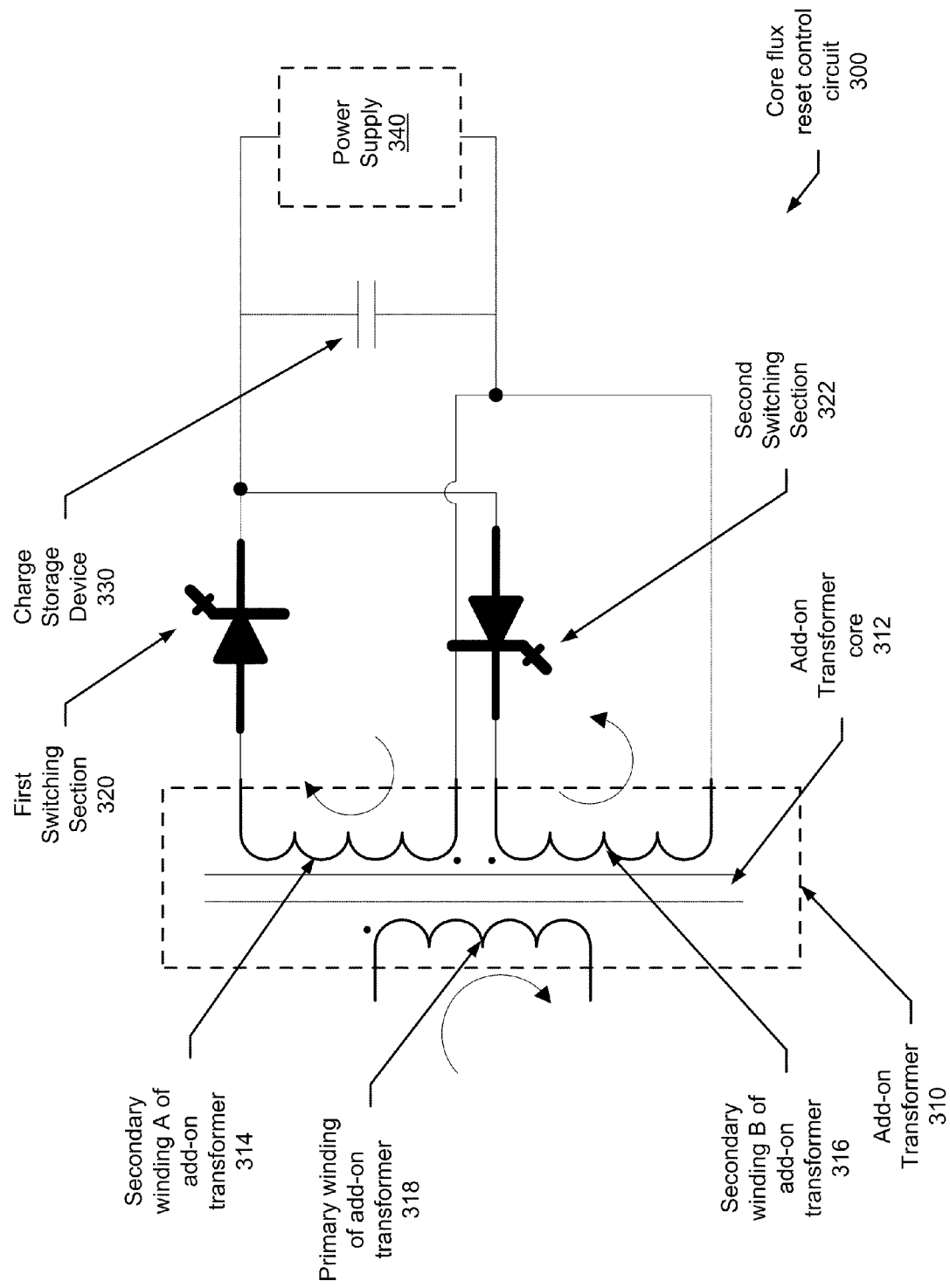

FIG. 3 shows a single line diagram of the secondary side with an asymmetric solid state configuration of a transformer. Specifically, FIG. 3 shows a variation of the core flux reset control circuit (210) described with respect to FIG. 2 above. In one or more embodiments of the invention, the core flux reset control circuit (300) includes an add-on transformer (310), a first switching section (320), a second switching section (322), a charge storage device (330), and, optionally, a power supply (340). In one or more embodiments of the invention, the add-on transformer (310) includes a primary winding of the add-on transformer (318), an add-on transformer core (312), secondary winding A of the add-on transformer (314), and secondary winding B of the add-on transformer (316). The system described in FIG. 3 may be configured to control the magnetic flux in the primary transformer core using the add-on transformer (316) between −Φ/2 and +Φ/2. Those skilled in the art will appreciate that the system described in FIG. 3 may also be configured to control the magnetic flux in the primary transformer core using the add-on transformer (316) in a range of Φ, where the values of the minimum and maximum magnetic flux are between −Φ and +Φ.

In one or more embodiments of the invention, secondary winding A of the add-on transformer (314) is configured to deliver a charge induced from the add-on transformer core (312) to the first switching section (320). The induced charge delivered by the add-on transformer core (312) to the first switching section (320) may be a DC magnetizing current created from the magnetic flux in the add-on transformer core (312), which may in turn originate from the magnetic flux in the primary transformer core (not shown). In one or more embodiments of the invention, when the first switching section (320) is closed, the electric charge is allowed to flow beyond the first switching section (320). The first switching section (320) may be closed at a predetermined time or upon the occurrence of an event, such as the end of an electric pulse received by the primary winding of the add-on transformer (318). By delivering the charge induced from the add-on transformer core (312) to the first switching section (320), a component of the magnetic flux (either positive or negative) in the add-on transformer core (312) is reduced.

In one or more embodiments of the invention, when the first switching section (320) is closed, electric charge flows into the charge storage device (330). The charge storage device (330) may be a device that stores energy, including but not limited to a capacitor. The amount of stored electric charge in the charge storage device (330) may continue to increase while the first switching section (320) remains closed.

In one or more embodiments of the invention, as electric charge flows from secondary winding A of the add-on transformer (314), the magnetic flux in the add-on transformer core (312) (and therefore the magnetic flux of the primary transformer core (155), as described above with respect to FIG. 2) may be reduced. When the magnetic flux in the add-on transformer core (312) (and primary transformer core) approaches and/or reaches zero, the first switching section (320) opens. The first switching section (320) may also open at a predetermined value other than zero. The first switching section (320) may also open based on the occurrence of some other suitable predetermined event or achievement of a predetermined threshold, including but not limited to an amount of electric charge in a charge storage device (330), an amount of magnetic flux in the add-on transformer core (312), an amount of energy delivered to the charge storage device (330), a suitable occurrence of an event, or a value of a component in the system described in FIGS. 1-4. When the first switching section (320) opens, the second switching section (322) closes. The second switching section (322) may close simultaneously with the opening of the first switching section (320), at a point in time before the opening of the first switching section (320), or at a point in time after the opening of the first switching section (320). The description and functionality of the first switching section (320) and the second switching section (322) are substantially similar to the first switching section (230) described above with respect to FIG. 2. The first switching section (320) and the second switching section (322) may be controlled by a control unit (not shown), as described above with respect to FIG. 1.

When the first switching section (320) opens and the second switching section (322) closes, the charge storage device (330) releases the charge (i.e., controlled voltage) it has accumulated while the first switching section (320) was closed and the second switching section (322) was open. The controlled voltage flows from the charge storage device (330) through the second switching section (322) and into secondary winding B of the add-on transformer (316), building a component (either negative or positive) of the magnetic flux in the add-on transformer core (312) (and therefore also building the component of the magnetic flux in the primary transformer core (155), as described above with respect to FIG. 2). In one or more embodiments of the invention, the component of the magnetic flux that builds in the add-on transformer core (312) (and therefore also in the primary transformer core) is the opposite polarity of the polarity of the magnetic flux that was removed from the add-on transformer core (312) (and therefore also in the primary transformer core) while the first switching section (320) was closed and the second switching section (322) was open. When the magnetic flux added to the add-on transformer core (312) (and therefore also in the primary transformer core) reaches a predetermined threshold, then the second switching section (322) opens. The second switching section (322) may also open based on the occurrence of some other suitable predetermined event or achievement of a predetermined threshold. The timing of the opening of the second switching section (322) may be shortly before the start of the next electric pulse received from the primary winding of the add-on transformer (318). The first switching section (320) and the second switching section (322) may remain open until the next electric pulse received from the primary winding of the add-on transformer (318) ends.

As in FIG. 2, the controlled voltage applied to secondary winding A of the add-on transformer (314) and secondary winding B of the add-on transformer (316) is induced to the primary winding of the add-on transformer (318) through the add-on transformer core (312). From there, the controlled voltage is applied by the secondary winding of the primary transformer (coupled to the primary winding of the add-on transformer (318)) to the primary transformer core to reduce and/or control the magnetic flux in the primary transformer core.

Optionally, in one or more embodiments of the invention, the power supply (340) is configured to provide voltage to the charge storage device (330) that is not provided by secondary winding A of the add-on transformer (314) through the first switching section (320). The voltage provided by the power supply (340) may be of a type (e.g., AC, DC) required by the charge storage device (330). A control unit (not shown) may be used to control the timing and/or level of voltage provided by the power supply (340). The control unit for the power supply (340) may be the same control unit described above with respect to the first switching section (320).

Figure 4A:
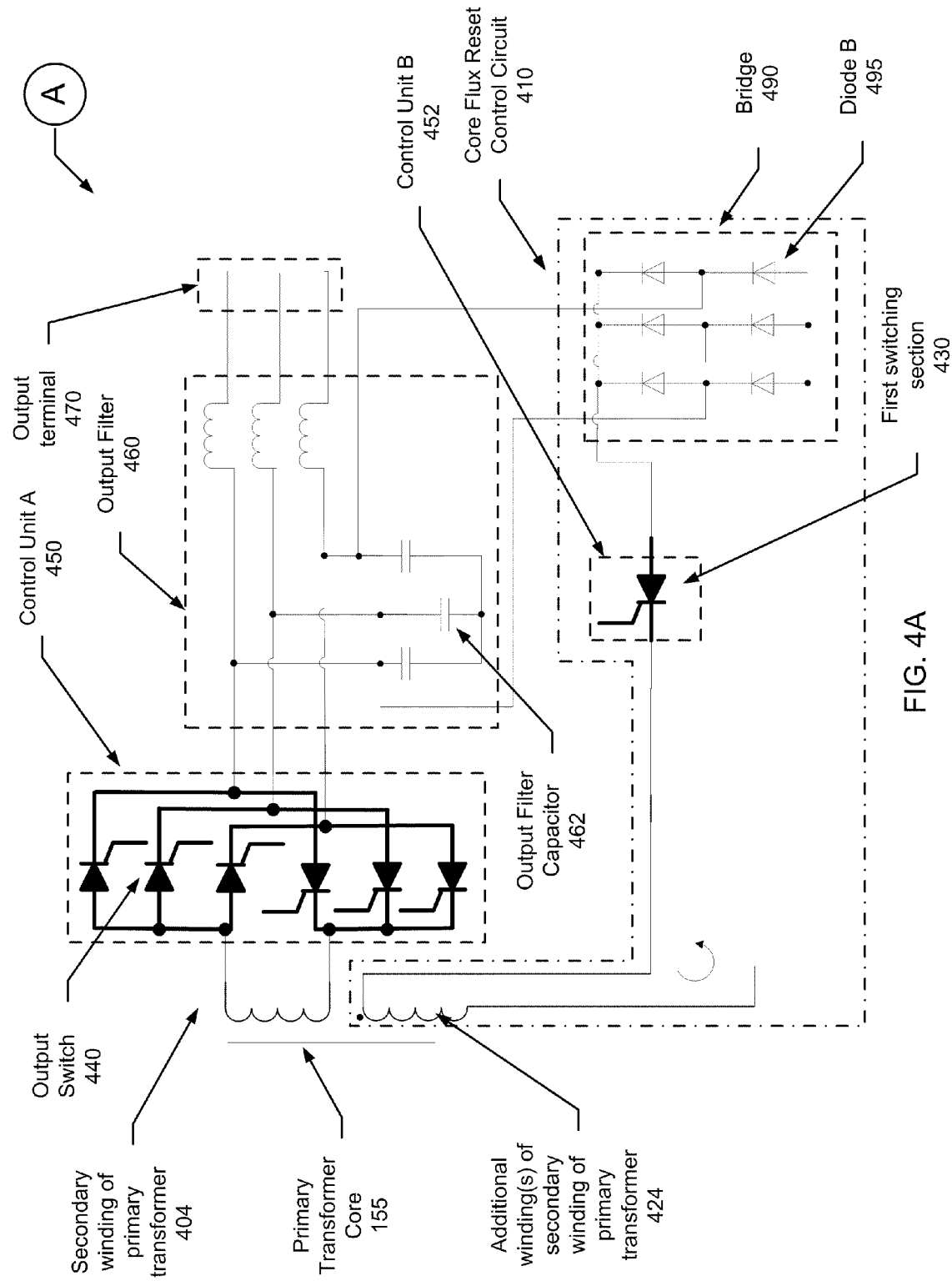

FIG. 4A shows a single line diagram of the secondary side with an asymmetric solid state configuration of a transformer in accordance with one or more embodiments of the invention. The system in FIG. 4A varies from the system shown in FIG. 2 in that the add-on transformer of FIG. 2 is not in FIG. 4A. Instead, the core flux reset control circuit (410) is attached to an additional winding of the secondary winding of the primary transformer (424). The additional winding of the secondary winding of the primary transformer (424) may be a single extra winding or multiple extra windings of the secondary winding of the primary transformer (404), where the single extra winding or multiple extra windings are galvanically isolated from the secondary winding of the primary transformer (404). The additional winding of the secondary winding of the primary transformer (424) may also be a separate, galvanically isolated transformer winding capable of providing a DC magnetizing current. In one or more embodiments of the invention, the core flux reset control circuit (410) is attached to the secondary winding of the primary transformer (404).

The system in FIG. 4A otherwise operates substantially similar to the system described above with respect to FIG. 2. In other words, the functionality and description of the output switch (440), control unit A (450), output filter (460), output terminal (470), control unit B (452), first switching section (430), bridge (490), and diode B (495) is substantially similar to the functionality and description of the output switch (240), control unit A (250), output filter (260), output terminal (270), control unit B (252), first switching section (230), bridge (290), and diode B (295) described above with respect to FIG. 2. Further, the functionality and description of the core flux reset control circuit (300) described above with respect to FIG. 3 may be substantially similar to the functionality and description of the core flux reset control circuit (410) in FIG. 4A.

Figure 4B:
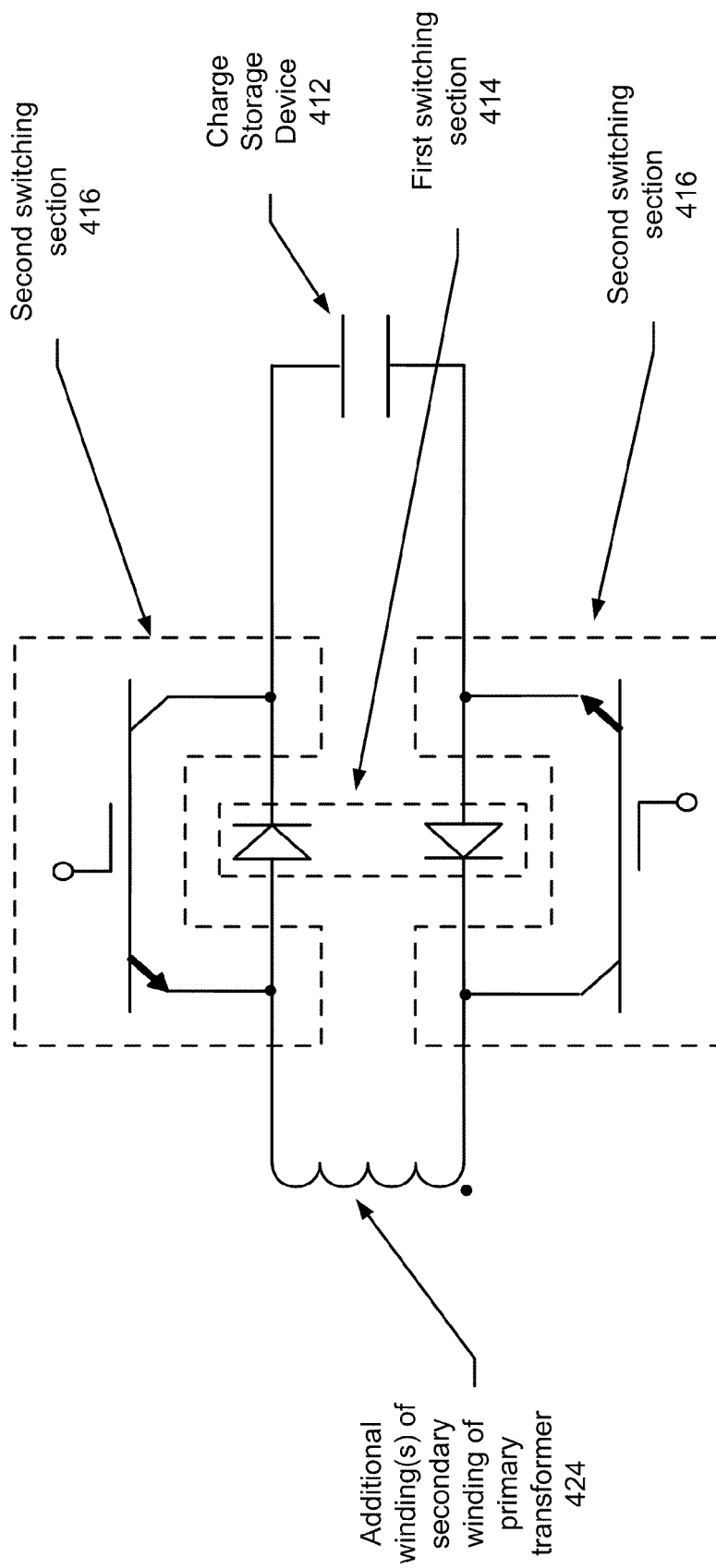
Figure 4C:
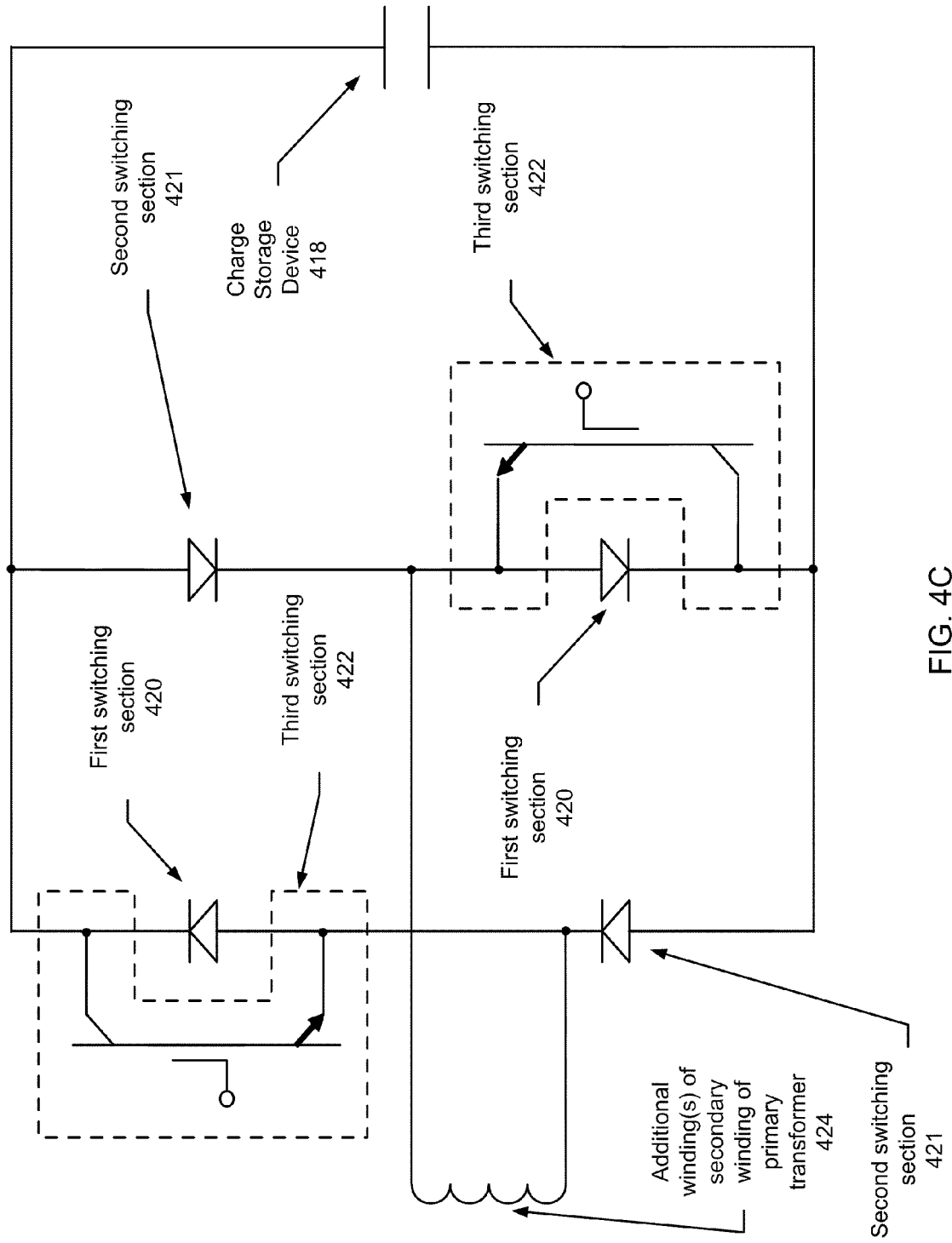

FIGS. 4B and 4C each show an example of a core flux reset control circuit (as described above) in accordance with one or more embodiments of the invention. As shown in FIG. 4B, the core flux reset control circuit may include an additional winding of the secondary winding of the primary transformer (424), a first switching section (414), a second switching section (416), and a charge storage device (412). The charge storage device (412) shown in FIG. 4B is a capacitor. As with other embodiments of the invention, those skilled in the art will appreciate that a capacitor may have multiple configurations (e.g., a single capacitor, multiple capacitors in parallel). In addition, other charge storage devices may be used in one or more embodiments of the invention. In one or more embodiments of the invention, the core flux reset control circuit does not require an isolated winding (e.g., additional winding of the secondary winding of the primary transformer (424)). Thus, the core flux reset control circuit may be directly connected to the secondary winding of the primary transformer (e.g., (404) in FIG. 4A).

The first switching section (414) shown in FIG. 4B includes two diodes, one connected to each side of the charge storage device (412), and both diodes are configured to allow charge to flow in only one direction. Those skilled in the art will appreciate that other types of switches and/or different numbers of switches and/or different configurations may be used in the first switching section (414). The second switching section (416) shown in FIG. 4B includes two IGBTs, each one connected in parallel with, and with opposite polarity to, each of the diodes of the first switching section (414). Both IGBTs are configured to allow charge to flow in only one direction when the IGBTs are closed. Those skilled in the art will appreciate that other types of switches and/or different numbers of switches and/or different configurations may be used in the first switching section (414) and the second switching section (416).

The system in FIG. 4B may operate to control the magnetic flux in the core of the primary transformer between zero and a flux component (e.g., $\Phi$, $-\Phi$). The system in FIG. 4B may also operate according to the embodiments described above with respect to FIG. 3. In other words, to control the magnetic flux in the core of the primary transformer between two different non-zero components (e.g., $\Phi/2$ and $-\Phi/2$). In the latter case, the second switching section (416) may be open to allow charge to flow through the first switching section (414) to reduce a first component of the magnetic flux in the primary transformer. When the second switching section (416) closes, the charge stops flowing through the first switching section (414) and begins flowing through the second switching section (416) to add a second component of the magnetic flux to the primary transformer. When the second switching section (416) opens, then the charge again flows through the first switching section (414) to reduce the first component of the magnetic flux in the core of the primary transformer.

Turning to FIG. 4C, the core flux reset control circuit includes an additional winding of the secondary winding of the primary transformer (424) (or, as described above, the core flux reset control circuit may be connected directly to the secondary winding of the primary transformer), a first switching section (420), a second switching section (421), a third switching section (422), and a charge storage device (418). The description of the components of FIG. 4C, as well as corresponding functionality, are substantially similar to those described above with respect to FIG. 4B. The configuration of the first switching section (420), the second switching section (421), and the third switching section (422) in FIG. 4C differs from the first switching section (414) and the second switching section (416) in FIG. 4B in that the first switching section (420) and the second switching section (421) in FIG. 4C each include two diodes in a type of bridge configuration, and the IGBTs of the third switching section (422) are connected in parallel with (but still with opposite polarity to) the two diodes in the first switching section (420). In one or more embodiments of the invention, the configuration shown in FIG. 4C allows the switches in the third switching section (422) to be opened with a reduced likelihood of the switches in the third switching section (422) of being destroyed or otherwise damaged by the spikes in charge caused by the opening and closing of the switches. Those skilled in the art will appreciate that other types of switches and/or different numbers of switches and/or different configurations may be used in the first switching section (420), the second switching section (421), and the third switching section (422).

The system in FIG. 4C may operate to control the magnetic flux in the core of the primary transformer between zero and a flux component (e.g., $\Phi$, $-\Phi$). The system in FIG. 4C may also operate according to the embodiments described above with respect to FIG. 3. In other words, to control the magnetic flux in the core of the primary transformer between two different non-zero components (e.g., $\Phi/2$ and $-\Phi/2$). In the latter case, while the electric pulse is delivered to the primary transformer, the third switching section (422) may be open to allow charge to flow through the first switching section (420) to begin charging the charge storage device (418). When the electric pulse delivered to the primary transformer ends, then a magnetizing current, induced by the magnetic flux accumulated in the primary transformer core during the electric pulse, begins to flow through the core flux reset control circuit in the opposite direction relative to the electric pulse. Because the magnetizing current flows through the core flux reset control circuit in the opposite direction relative to the electric pulse, the magnetic current flows through the second switching section (421) to continue charging the charge storage device (418). While the magnetizing current flows through the second switching section (421), a first component of the magnetic flux in the core of the primary transformer is reduced. When the magnetizing current approaches zero, the first component of the magnetic flux in the core of the primary transformer also approaches zero.

Continuing with FIG. 4C, when the magnetizing current approaches zero, the third switching section (422) is turned on (i.e., closes) and the magnetic current stops flowing through the second switching section (421). When the magnetic current stops flowing through the second switching section (421), the charge storage device (418) stops charging and begins discharging. When the charge storage device (418) discharges, a controlled voltage is delivered to the primary transformer through the third switching section (422), bypassing the first switching section (420). In one or more embodiments of the invention, the third switching section (422) is called a preset switching section, where each of the switches in the third switching section (422) called preset switches. When the controlled voltage is applied to the primary transformer, a second component of the magnetic flux is added to the core of the primary transformer.

At some triggering event, the third switching section (422) is turned off (i.e., opens), which stops adding the second component of the magnetic flux to the core of the primary transformer. A triggering event may include, but is not limited to, an amount of time that the third switching section (422) is closed, when the amount of charge in the charge storage device (418) reaches a certain level, or when the next electric pulse is applied to the primary transformer. When the third switching section is opened, the next electric pulse is then applied to the primary transformer, causing an electric pulse to flow through the first switching section (420) charge the charge storage device (418). The application of the electric pulse to the primary transformer also adds the first component of the magnetic flux to the core of the primary transformer, thereby also reducing the second component of the magnetic flux to the core of the primary transformer.

Figure 5:
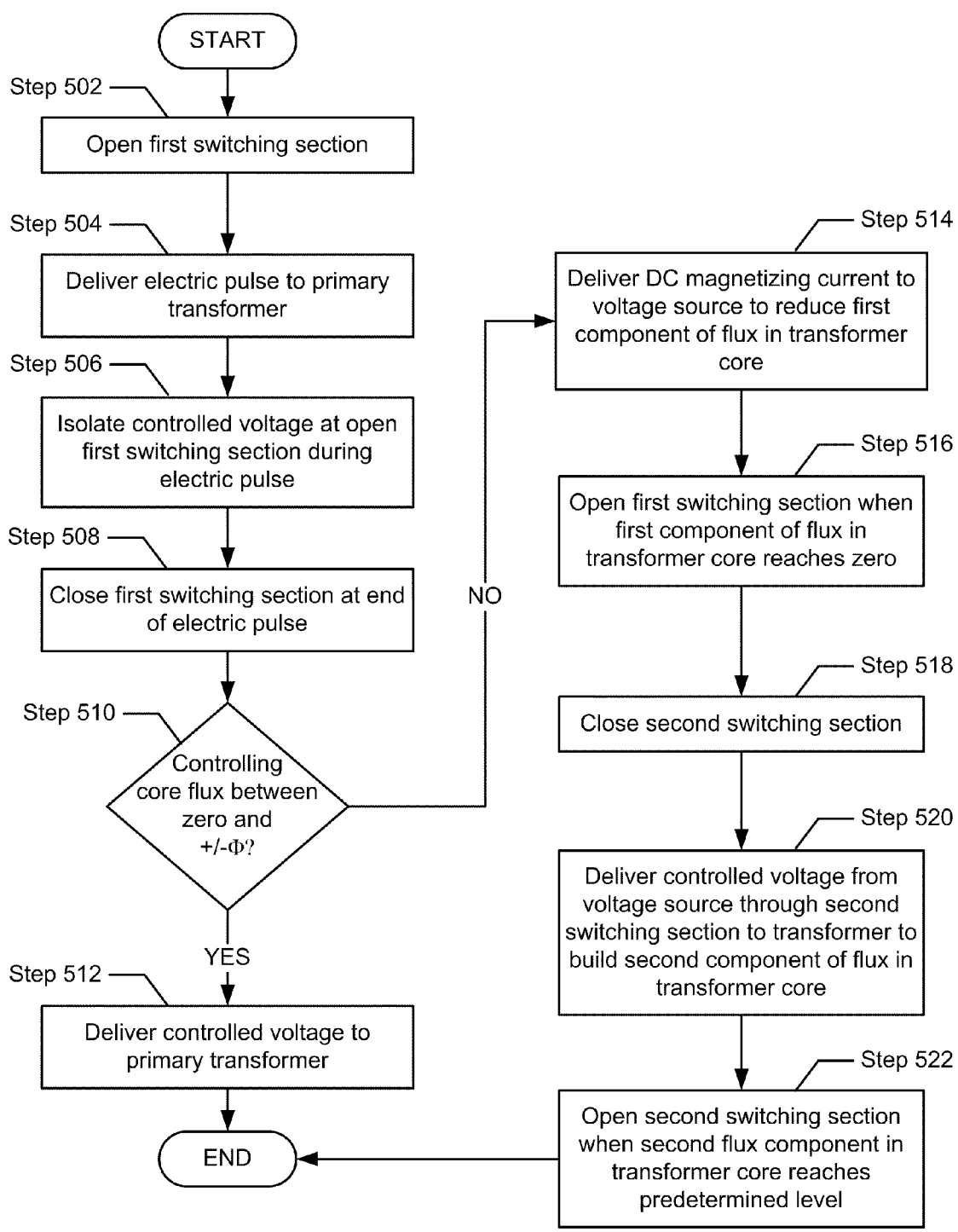
FIGS. 5-6B show flowcharts of methods in accordance with one or more embodiments of the invention.
Figure 6A:
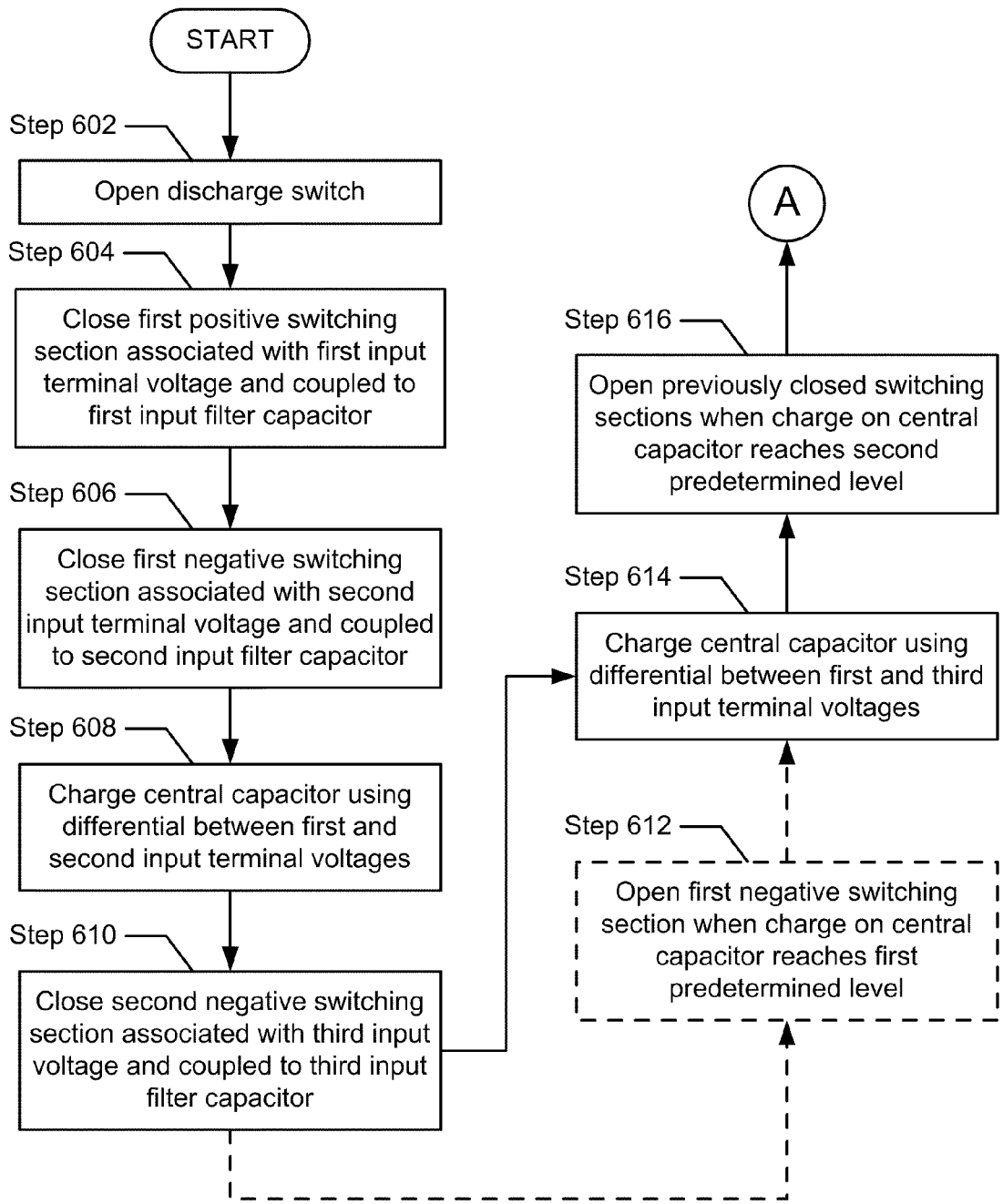
Figure 6B:
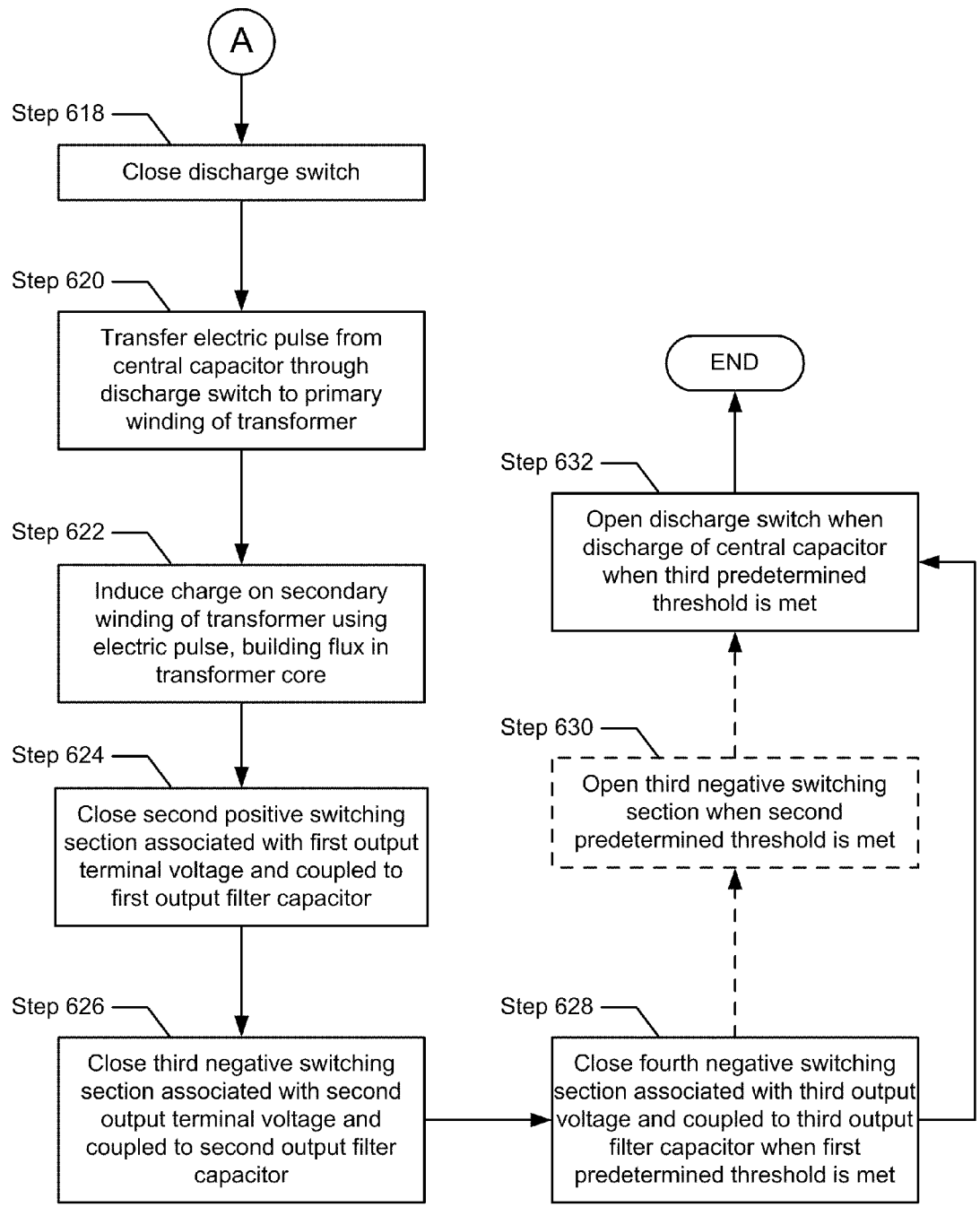

FIGS. 5-6B show flowcharts of methods of transferring electric charge in accordance with one or more embodiments of the invention. The methods described in FIGS. 5-6B each apply to a single electric pulse from among a number of electric pulses. Those skilled in the art will appreciate that the process may be repeated for a large number of electric pulses, even at high frequencies (e.g., 1 kHz or higher). A purpose of the methods described in FIG. 5 is to control the magnetic flux in a transformer core. A purpose of the methods described in FIGS. 6A and 6B is to demonstrate charging and discharging, respectfully, of a central capacitor through a transformer using solid state switching technology. During the charging of the central capacitor, as described with respect to the method of FIG. 6A below, control of the magnetic flux in the transformer, as described with respect to the method of FIG. 5 below, is performed.

While the various steps in these flowcharts are presented and described sequentially, one of ordinary skill will appreciate that some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIGS. 5-6B, may be included in performing this method for transferring electric charge. Accordingly, the specific arrangement of steps shown in FIGS. 5-6B should not be construed as limiting the scope of the invention. Further, one or more steps described below with respect to FIGS. 5-6B may be performed using a particular computing device, as described, for example, in FIG. 8 below.

Referring to FIG. 5, in Step 502, a first switching section is opened. In one or more embodiments of the invention, opening the first switching section prevents current and/or voltage from moving from one side of the switch to the other side of the switch. In Step 504, an electric pulse is delivered to the primary transformer. Details of how the electric pulse is delivered to the primary transformer may be found below with respect to FIG. 6B.

In Step 506, the controlled voltage is isolated at the open first switching section during the electric pulse. In one or more embodiments of the invention, the controlled voltage is used to reset the core flux. In Step 508, the first switching section is closed at the end of the electric pulse. In one or more embodiments of the invention, the first switching section is closed exactly when the electric pulse ends. The first switching section may also be closed a small fraction of a second after the electric pulse ends.

In Step 510, a determination is made as to whether the core magnetic flux is being controlled between zero and Φ or zero and −Φ. If the core magnetic flux is being controlled between zero and Φ or zero and −Φ, then the process proceeds to Step 512, where the controlled voltage is delivered to the transformer. Those skilled in the art will appreciate that the controlled voltage may be delivered to a secondary transformer coupled to a primary transformer so that the controlled voltage is delivered to the primary transformer. Once the controlled voltage is delivered to the transformer, the process ends.

Continuing with Step 510, if the core magnetic flux is not being controlled between zero and Φ or zero and −Φ, then the process proceeds to Step 514, where the DC magnetizing current is delivered to the voltage source to reduce a first magnetic flux component in the transformer core. The first magnetic flux component in the transformer core may be an interval between zero and Φ/2, zero and −Φ/2, or some other interval whose range is equivalent to Φ/2. The DC magnetizing current may originate from the magnetic flux in the transformer core.

In Step 516, the first switching section is open when the first magnetic flux component in the transformer core reaches zero. In one or more embodiments of the invention, the first switching section may open when the first magnetic flux component in the transformer core reaches some predetermined non-zero value or threshold.

In Step 518, the second switching section is closed. In one or more embodiments of the invention, the second switching section is closed at the same time that the first switching section is opened. The second switching section may also be closed at some point in time (e.g., in a fraction of a second) before or after the first switching section is opened.

In Step 520, the controlled voltage is delivered from the voltage source through the second switching section to the transformer to build a second magnetic flux component in the transformer core. Those skilled in the art will appreciate that the controlled voltage may be delivered to a secondary transformer coupled to a primary transformer such that the controlled voltage is delivered to the primary transformer. In one or more embodiments of the invention, the second magnetic flux component has a polarity opposite to the polarity of the first magnetic flux component.

In Step 522, the second switching section is opened when the second magnetic flux component in the transformer core reaches a predetermined threshold. In one or more embodiments of the invention, the predetermined threshold is set in such a manner that the amount of the second magnetic flux component is equal in magnitude to the amount of the first magnetic flux component. Said another way, the absolute value of the amount of the second magnetic flux component is equal (within a tolerance range) to the absolute value of the amount of the first magnetic flux component. The predetermined level may also be determined based on some other input or variable. When Step 522 is completed, the process ends.

Referring to FIG. 6A describing the charging of a central capacitor to send electric pulses to a transformer, in Step 602, a discharge switch is opened. Opening the discharge switch prohibits an electric charge from flowing through the discharge switch. In Step 604, a first positive switching section, associated with a first input terminal voltage and coupled to a first input filter capacitor, is closed. Closing the first positive switching section allows electric charge to flow through the first positive switching section. The first positive switching section may be connected to an input terminal that has a positive or negative voltage. When the input is three phase AC voltage, the first positive switching section may be connected to the input terminal that is the only positive voltage terminal (i.e., the other two input terminals have a negative voltage) or the only negative voltage terminal (i.e., the other two input terminals have a positive voltage).

In Step 606, a first negative switching section, associated with a second input terminal voltage and coupled to a second input filter capacitor, is closed. Closing the first negative switching section allows electric charge to flow through the first negative switching section. The first negative switching section may be connected to an input terminal that has a voltage polarity opposite of the voltage polarity of the input terminal connected to the first positive switching section described above with respect to Step 604. When the input is three phase AC voltage, the first negative switching section may be connected to the input terminal that is the least negative voltage terminal (when two input terminals have a negative voltage) or the least positive voltage terminal (when two input terminals have a positive voltage). In Step 608, the central capacitor is charged using a differential between the first and second input terminal voltages.

In Step 610, a second negative switching section, associated with a third input terminal voltage and coupled to a third input filter capacitor, is closed once the voltage in the central capacitor has reached a predetermined value. Closing the second negative switching section allows electric charge to flow through the second negative switching section. The second negative switching section may be connected to an input terminal that has the same voltage polarity as the voltage polarity of the input terminal connected to the first negative switching section described above with respect to Step 606. When the input is three phase AC voltage, the second negative switching section may be connected to the input terminal that is the most negative voltage terminal (when two input terminals have a negative voltage) or the most positive voltage terminal (when two input terminals have a positive voltage).

Optionally, in Step 612, the first negative switching section is opened when the current through the first negative switching section is zero. Opening the first negative switching section prevents electric charge from flowing through the first negative switching section. If the first negative switching section remains closed, however, then charge may not flow through the first negative switching section because of the voltage of the second negative switching section, combined with the configuration of the first positive switching section and the second negative switching section.

In Step 614, the central capacitor is charged using a differential between the first and third input terminal voltages. In Step 616, the previously closed switching sections are opened when the charge of the central capacitor reaches a second predetermined threshold. In one or more embodiments of the invention, when the charge of the central capacitor reaches a second predetermined threshold, then the current through the first positive switching section and the second negative switching section is zero. Opening the first positive switching section and the second negative switching section prevents electric charge from flowing through the first positive switching section and the second negative switching section, respectively. In one or more embodiments of the invention, if the switches (e.g., first positive switching section, second negative switching section) are latching devices (e.g., a SCR), then the latching comes off automatically (i.e., the switches open automatically) when the current flow through each of the switches stops.

Referring to FIG. 6B describing the discharging of the central capacitor to send electric pulses to the transformer, in Step 618, the discharge switch is closed. Closing the discharge switch allows electric charge to flow through the discharge switch. In Step 620, an electric pulse is transferred from the central capacitor through the discharge switch to the primary winding of the transformer. In Step 622, a charge is induced on the secondary winding of the transformer using the electric pulse, building magnetic flux in the transformer core.

In Step 624, a second positive switching section, associated with a first output terminal voltage and coupled to a first output filter capacitor, is closed. Closing the second positive switching section allows electric charge to flow through the second positive switching section. The second positive switching section may be connected to an output terminal that has a positive or negative voltage. When the output is three phase AC voltage, the second positive switching section may be connected to the output terminal that is the only positive voltage terminal (i.e., the other two output terminals have a negative voltage) or the only negative voltage terminal (i.e., the other two output terminals have a positive voltage).

In Step 626, a third negative switching section, associated with a second output terminal voltage and coupled to a second output filter capacitor, is closed. Closing the third negative switching section allows electric charge to flow through the third negative switching section. The third negative switching section may be connected to an output terminal that has a voltage polarity that is the same as the voltage polarity of the output terminal connected to the third negative switching section described above with respect to Step 624. When the output is three phase AC voltage, the fourth negative switching section may be connected to the output terminal that is the least negative voltage terminal (when two output terminals have a negative voltage) or the least positive voltage terminal (when two output terminals have a positive voltage).

In Step 628, a fourth negative switching section, associated with a third output terminal voltage and coupled to a third output filter capacitor, is closed when a first predetermined threshold is met. Closing the fourth negative switching section allows electric charge to flow through the fourth negative switching section. The first predetermined threshold may be a level of discharge of the central capacitor, a level of charge remaining in the central capacitor, a change in one of the output terminal voltages, or some other suitable threshold. The fourth negative switching section may be connected to an output terminal that has a voltage polarity opposite of the voltage polarity of the output terminal connected to the second positive switching section described above with respect to Step 624. When the output is three phase AC voltage, the first negative switching section may be connected to the output terminal that is the most negative voltage terminal (when two output terminals have a negative voltage) or the most positive voltage terminal (when two output terminals have a positive voltage).

Optionally, in Step 630, the third negative switching section is opened when a second predetermined threshold is met. Opening the third negative switching section prevents electric charge from flowing through the third negative switching section. The second predetermined threshold may be a level of discharge of the central capacitor, a level of charge remaining in the central capacitor, a change in one of the output terminal voltages, or some other suitable threshold. If the third negative switching section remains closed, however, then charge may not flow through the third negative switching section because of the voltage of the fourth negative switching section, combined with the configuration of the second positive switching section and the fourth negative switching section.

In Step 632, the discharge switch is opened when a third predetermined threshold is met. Opening the discharge switch prevents electric charge generated by the central capacitor from flowing to the transformer. The third predetermined threshold may be a level of discharge of the central capacitor, a level of charge remaining in the central capacitor, an amount of time that the central capacitor has discharged in the current cycle, or some other suitable threshold. In one or more embodiments of the invention, the second positive switching section, the third negative switching section (if the third negative switching section had not already been opened in Step 630 above)), and the fourth negative switching section are also opened Opening the second positive switching section, the third negative switching section, and the fourth negative switching section may occur, for example, at the same time or at about the same time as the opening of the discharge switch, or at a suitable fourth predetermined threshold. Opening the second positive switching section, the third negative switching section, and the fourth negative switching section prevents electric charge from flowing through the second positive switching section, the third negative switching section, and the fourth negative switching section, respectively.

In one or more embodiments of the invention, the methods described in FIGS. 5-6B above may be implemented using any type of device that transfers electric charge. The methods described in FIGS. 5-6B may also be implemented using an AC-link system. The Example below describes the AC-link system in accordance with one or more embodiments of the invention. The example is for explanatory purposes only and is not intended to limit the scope of the invention. Terminology used in FIGS. 1-6B may be used in the examples without further reference to FIGS. 1-6B.

EXAMPLE

Figure 7A:
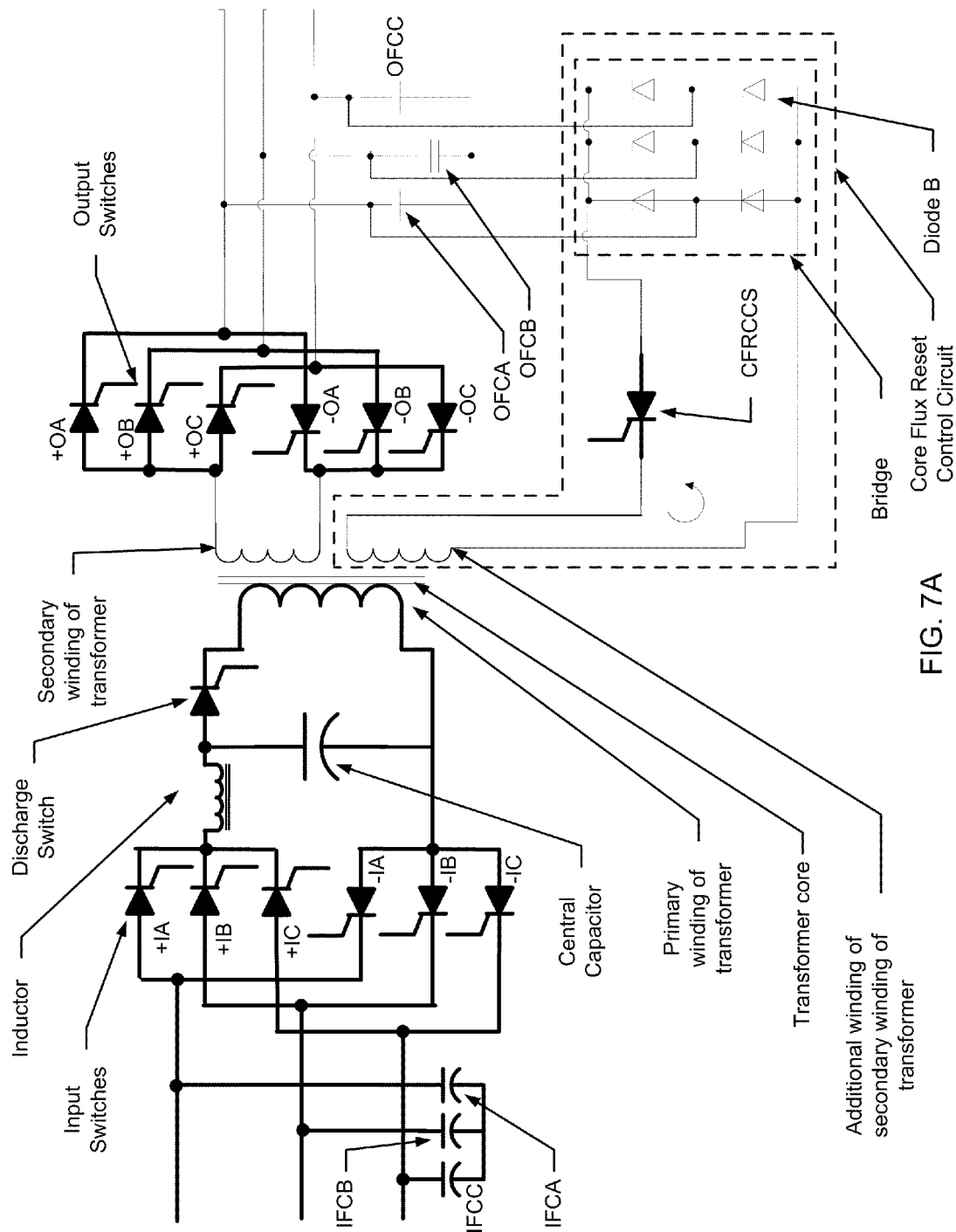
FIGS. 7A-7G show an example in accordance with one or more embodiments of the invention.

Consider the following example that describes a method to control saturation in a transformer core for a transformer system referred to herein as the AC-link system. In this example, only one cycle is shown, but the method may be repeated any number of times. The AC-link system of this example is a 1:2 AC-to-AC step up transformer. Illustrations of the Example are shown in FIGS. 7A-7G. FIG. 7A shows the overall circuit with labels for each component. The components labeled in FIG. 7A are consistent with the labels found for similar components in FIGS. 1 and 4. In addition, each of the input and output switches are labeled. Input switches with positive polarity are labeled as "+I" followed by a letter corresponding to one of the three phases of the AC circuit. Input switches with negative polarity are similarly labeled as "−I" followed by the letter corresponding to one of the three phases of the AC circuit. Output switches with positive polarity are labeled as "+O" followed by a letter corresponding to one of the three phases of the AC circuit. Output switches with negative polarity are similarly labeled as "−O" followed by the letter corresponding to one of the three phases of the AC circuit. In addition, the input filter capacitors and output filter capacitors are each labeled to designate the appropriate phase of the AC circuit. For example, "IFCA" designates the input filter capacitor for the first or A phase. The labels shown in FIG. 7A are not shown in subsequent figures of this Example 1, but are nonetheless described in the text herein. Switches that are closed are encircled, while switches that are open are not encircled. Those skilled in the art will appreciate that other charge transfer devices, besides the AC-link system, may be used in conjunction with the invention.

Figure 7B:
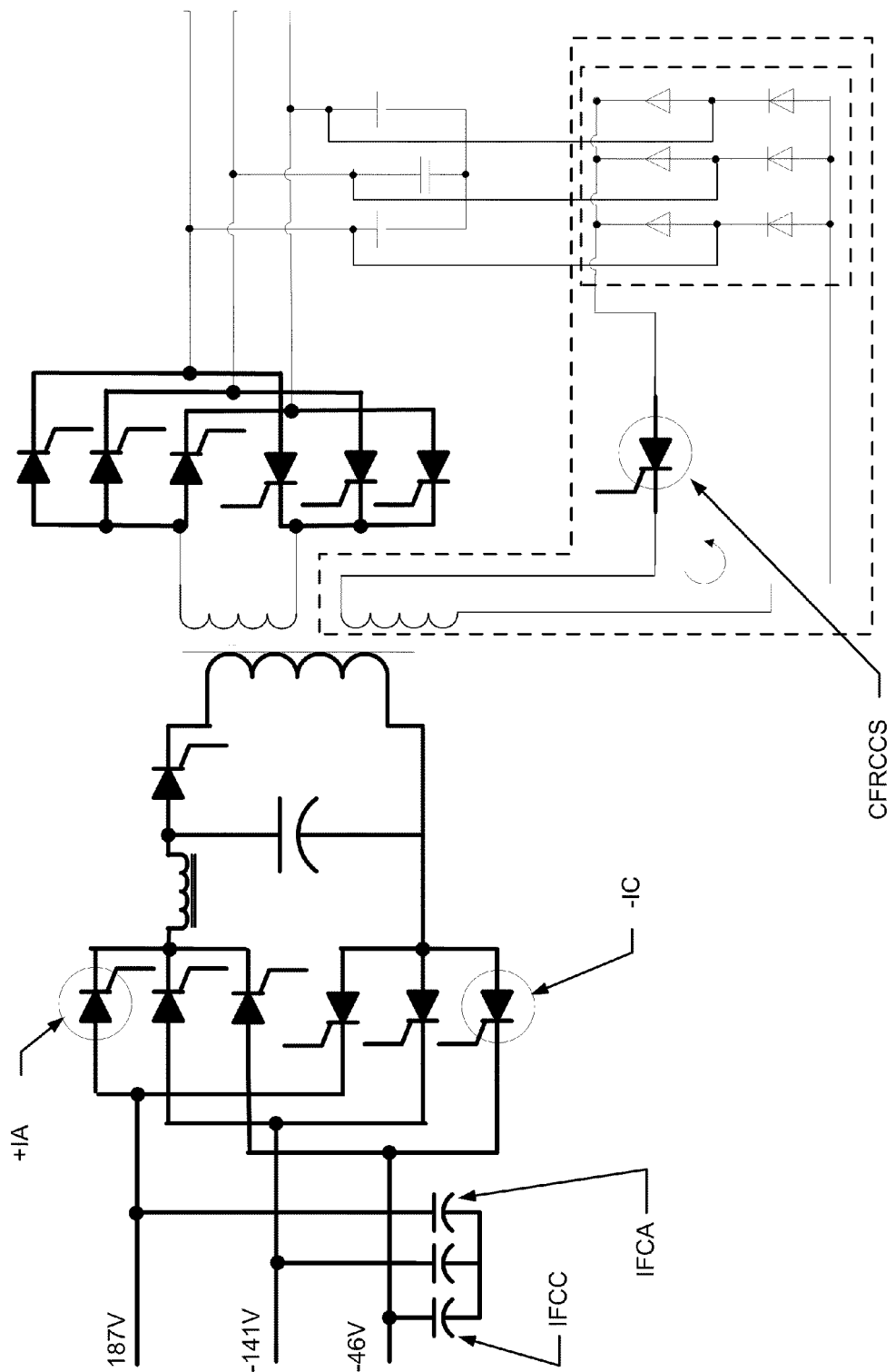

FIG. 7B shows the part of the cycle where charging the central capacitor is about to begin. In this example, the input terminals are configured for three-phase AC power, where input terminal A carries 187V, input terminal B carries −141V, and input terminal C carries −46V. As shown in FIG. 7B, input switches +IA and −IC are closed, as is the CFRCCS (the core flux reset control circuit switch). In this example, input switch +IA is closed because, as explained above with respect to FIG. 6, terminal A corresponds to the only positive voltage among the input terminals. Terminal −IC is also closed because it has the least negative voltage of the two input terminals having a negative input voltage. All other switches, including the discharge switch and all output switches, are open. This Example assumes that at least one cycle has preceded the cycle described in this Example. As a result, the central capacitor has already sent an electric pulse to the transformer, which means that magnetic flux has accumulated in the transformer core. Two process are occurring at this point in the example. First, the central capacitor is charging. Second, the core flux reset control circuit is engaged to control the magnetic flux in the transformer core.

At the beginning of the charging process, the central capacitor may have been discharged completely by the previous discharging process. The central capacitor may also have a positive or negative residual charge after the previous discharging process. Because the filter capacitors are connected to the AC input voltages through an inductance, the filter capacitor voltages tend to follow these voltages very closely. Accordingly, the voltages that exist on the filter capacitors at the beginning of the charging process depends on at what point in time the charging process is taking place. In this example, the voltage difference between IFCA (187V) and IFCC (−46V) is applied to the central capacitor in a circuit that flows from IFCC to IFCA to +IA to the inductor to the central capacitor to −IC and back to IFCC. In the meantime, the core flux reset control circuit is applying a predominantly constant voltage, as described above with respect to FIG. 2, to the transformer to reduce the magnetic flux in the transformer core.

Figure 7C:
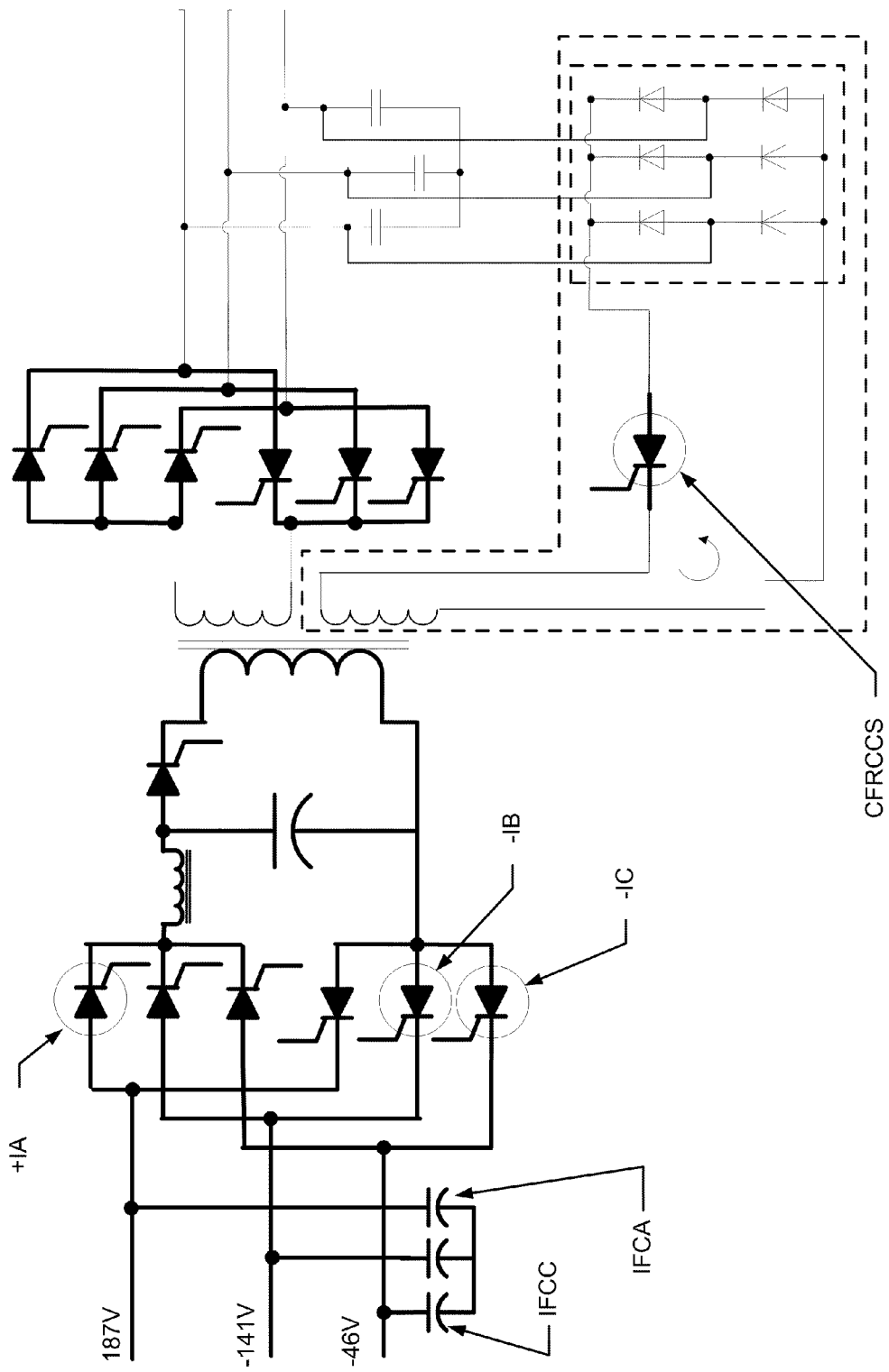

In FIG. 7C, as the central capacitor continues to be charged by the circuit described in FIG. 7B (i.e., IFCC to IFCA to +IA to the inductor to the central capacitor to −IC and back to IFCC), switch −IB is closed. The core flux reset control circuit continues to operate as described in FIG. 7B.

Figure 7D:
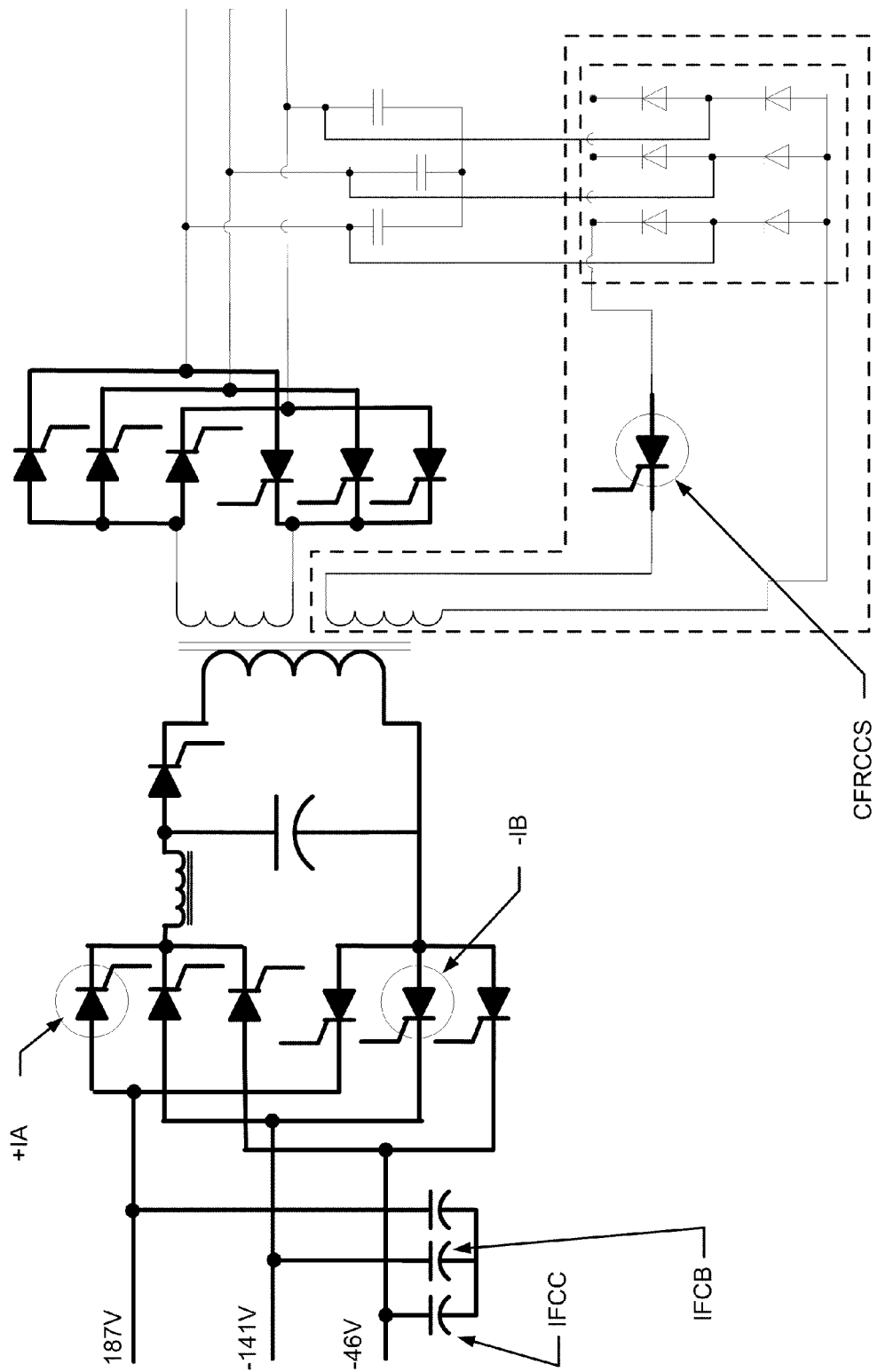

In FIG. 7D, the central capacitor continues to charge, but using a different circuit. Now, because the phase B input voltage (−141V) is more negative than the phase C input voltage (−46V) and because switch −IB is closed, the current is diverted through −IB, and a negative voltage is applied to −IC, opening −IC. In one or more embodiments of the invention, switch −IC may remain closed, but current ceases to flow through switch −IC because of the input terminal voltage associated with switch −IB, combined with the configuration of switch +IA and switch −IB. With the current now flowing along its new path (i.e., IFCB to IFCA to +IA to the inductor to the central capacitor to −IB and back to IFCB), the charging process continues. The core flux reset control circuit continues to operate as described in FIG. 7B.

Figure 7E:
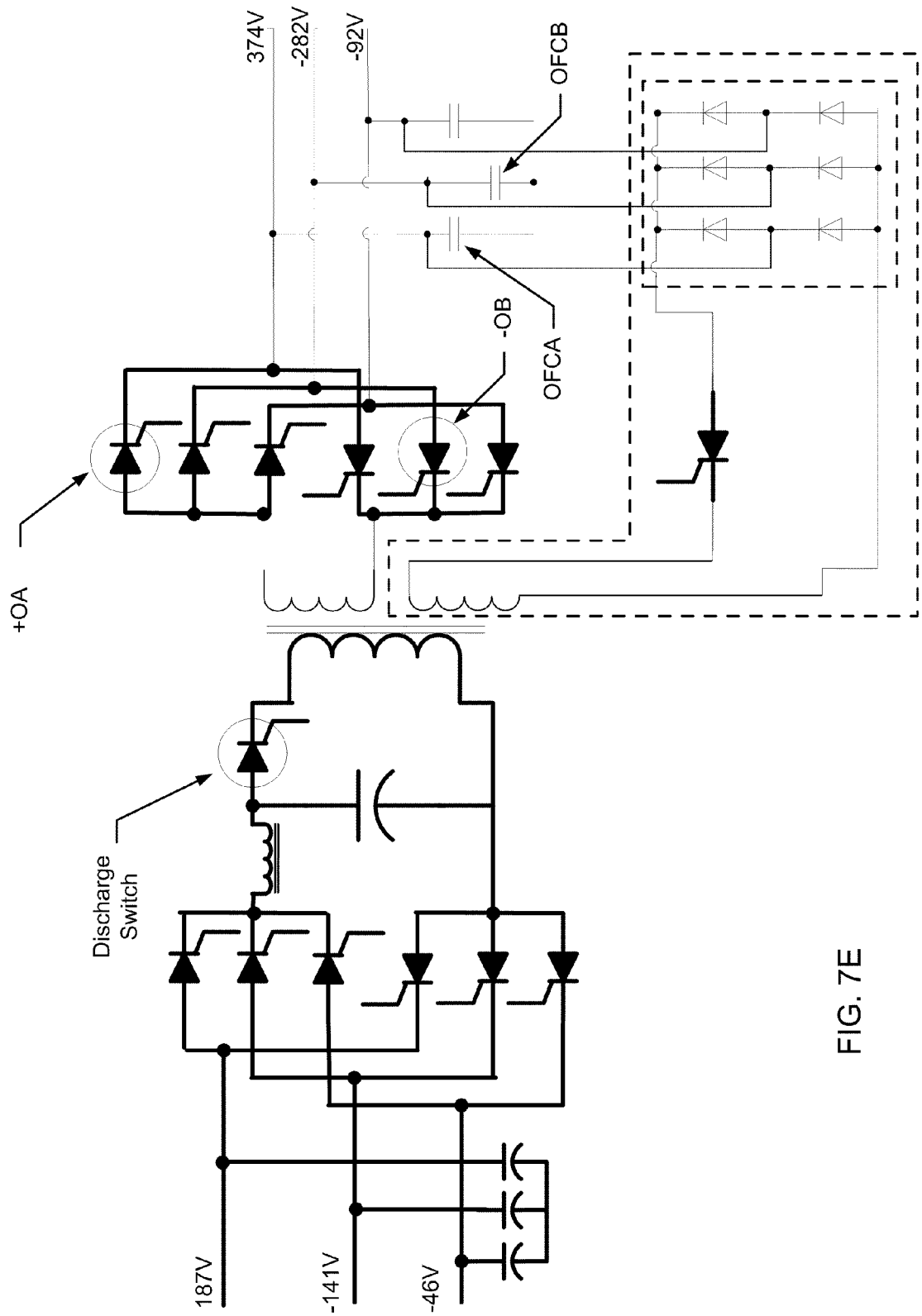

In FIG. 7E, charging of the central capacitor has ceased, and discharge of the central capacitor begins. As a result, +IA and −IB open. The CFRCCS also opens, which stops the operation of the core flux reset control circuit. At the same time, the discharge switch closes, allowing an electric pulse to be released from the central capacitor, through the discharge switch, and into the primary winding of the transformer. In this example, the output terminals are configured for three-phase AC power, where output terminal A carries 374V, output terminal B carries −282V, and input terminal C carries −92V. In addition, +OA and −OB are closed to allow the electric pulse, induced through the transformer to the secondary transformer winding, to be distributed. In this example, output switch +OA is closed because, as explained above with respect to FIG. 6, terminal A corresponds to the only positive voltage among the output terminals. Terminal −OB is also closed because it has the most negative voltage of the two output terminals having a negative output voltage. The flow on the secondary of the transformer is +OA to OFCA to OFCB to −OB to the secondary transformer winding and back to +OA. As the central capacitor discharges and induces the electric charge across the transformer to the secondary winding, magnetic flux begins to accumulate in the transformer core.

Figure 7F:
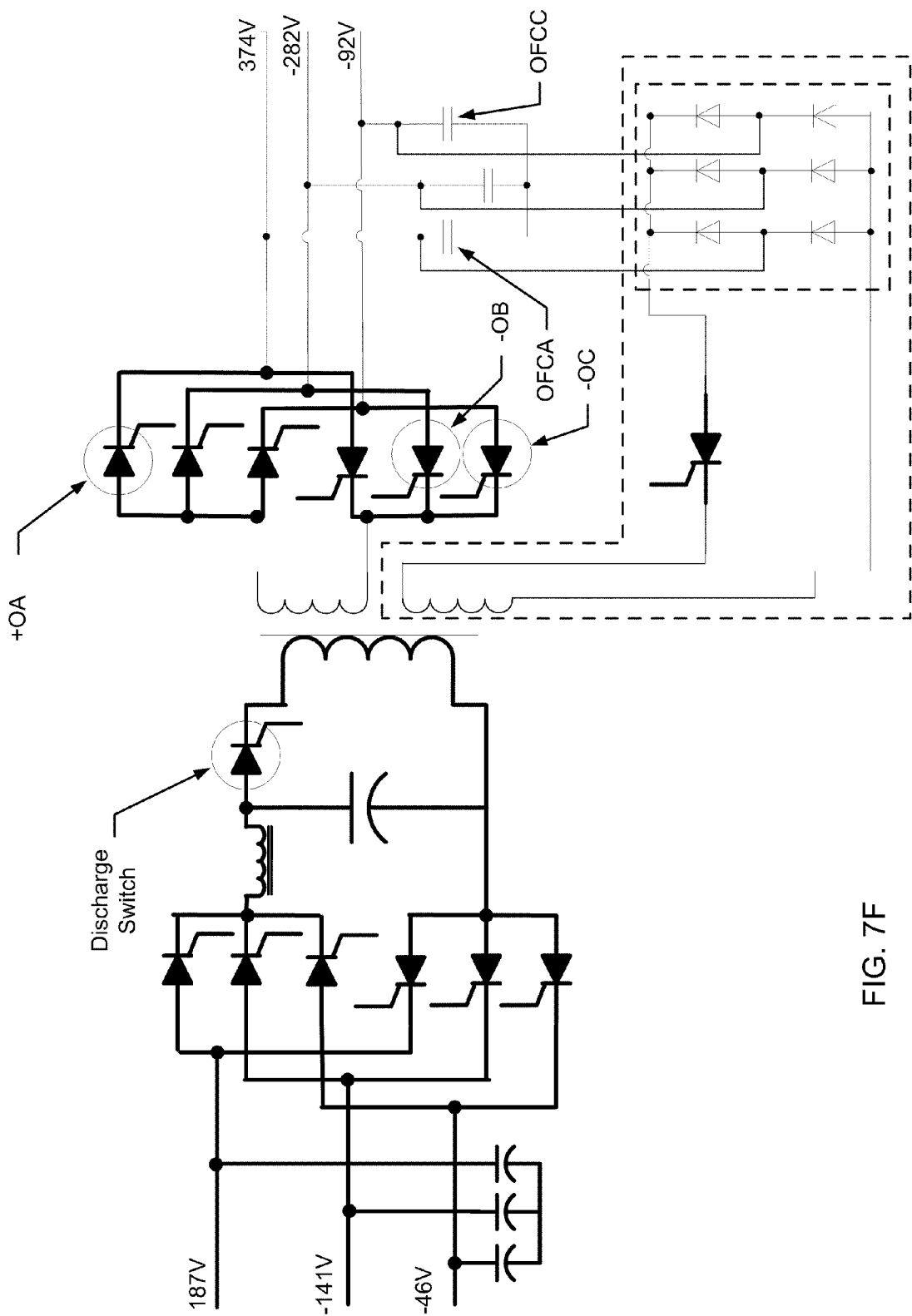

In FIG. 7F, as the central capacitor continues to discharge by the circuit described in FIG. 7E (i.e., +OA to OFCA to OFCB to −OB to the secondary transformer winding and back to +OA), switch −OC is opened. The core flux reset control circuit remains inactive because CFRCCS remains open.

Figure 7G:
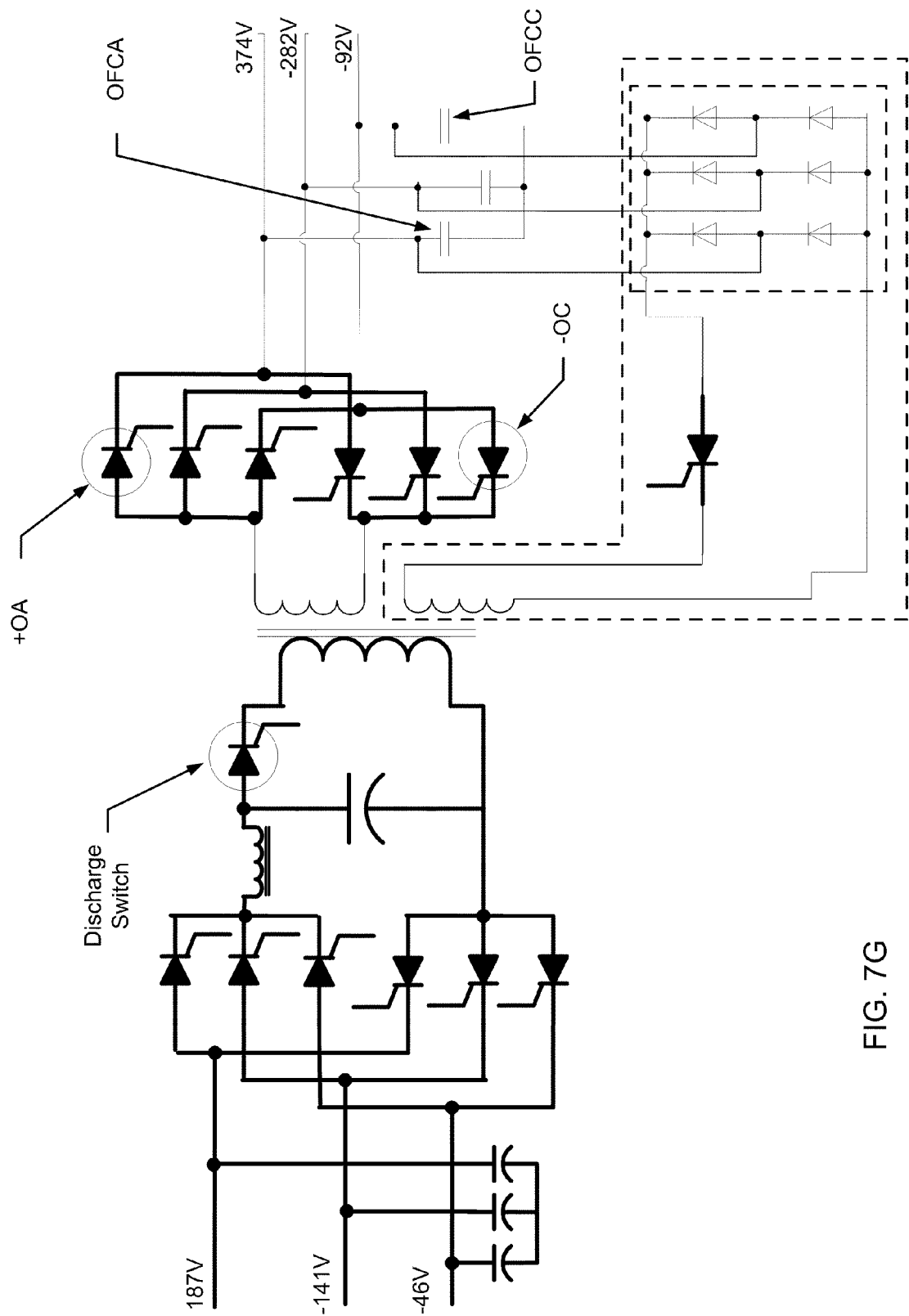

In FIG. 7G, the central capacitor continues to discharge, but using a different circuit path. The phase C output voltage is less negative than the phase B output voltage, and so the current is diverted through −OC, and a negative voltage is applied to −OB, opening −OB. In one or more embodiments of the invention, switch −OB may remain closed, but current ceases to flow through switch −OB because of the input terminal voltage associated with switch −OC, combined with the configuration of switch +OA and switch −OC. With the current now flowing along its new path (i.e., +OA to OFCA to OFCC to −OC to the secondary transformer winding and back to +OA), the discharging process continues. The core flux reset control circuit remains inactive because CFRCCS remains open. When the discharge process ends with the discharge current approaching zero (e.g., when the central capacitor has little to no more charge), the configuration of the switches reverts to a variation of what is shown in FIG. 7B, where +OA, −OB (if not already opened), −OC, and the discharge switch are opened, and where the CFRCCS, one of +IA, +IB, and +IC (e.g., the only one of the three positive input switches associated with a negative input terminal voltage or a positive input terminal voltage), and one of −IA, −IB, and −IC (e.g., the negative input switch having opposite voltage polarity of the positive input switch and associated with the least negative input terminal voltage or the least positive input terminal voltage) are each closed to begin the processes of charging the central capacitor and reducing the magnetic flux in the transformer core.

Using an asymmetric configuration reduces the cost to produce a charge transfer device, but saturation of the core of the charge transfer device may prevent the charge transfer device from operating efficiently, which may force the use of a larger transformer core and/or the use of higher cost electrical components. One or more embodiments of the invention provide a high duty cycle of the core flux reset control circuit. Further, embodiments of the core flux reset control circuit described herein are designed to have a duty cycle of slightly less than 50%, meaning that the time taken to deliver the controlled voltage to the primary transformer is slightly less than the time between the end of an electric pulse delivered from the primary winding of the primary transformer and the start of the next electric pulse delivered from the primary winding of the primary transformer. In one or more embodiments of the invention, the time taken to deliver the controlled voltage to the primary transformer is 95% of the time between the end of an electric pulse delivered from the primary winding of the primary transformer and the start of the next electric pulse delivered from the primary winding of the primary transformer. Having a longer duty cycle (i.e., closer to 50%, or closer to 100% of the time between the end of an electric pulse delivered from the primary winding of the primary transformer and the start of the next electric pulse delivered from the primary winding of the primary transformer) may allow for a lower reset voltage, which in turn may allow for less expensive components (e.g., lower voltage solid state switches) to be used.

Because of the high duty cycle and effectiveness of the core flux reset control circuit in minimizing the magnetic flux in the transformer to prevent saturation of the transformer core, the charge transfer device using solid state components may operate in an asymmetric configuration. In one or more embodiments of the invention, the asymmetric configuration requires approximately half the number of solid state components, which greatly reduces the cost to manufacture such a charge transfer device. The voltage and current levels used in both the primary and secondary of the charge transfer device may each range greatly and may be limited by operating characteristics of available solid state components.

Further, one or more embodiments of the invention provide the capability to operate at relatively high frequencies for a charge transfer device. For example, the frequency of the electric pulses delivered to the primary winding of the primary transformer may be as low as 1,000 Hertz and may be as high as 100 kilo-Hertz (or higher), depending on the power level, switch selection, and other parameters.

Further, one or more embodiments of the invention provide the capability of minimizing losses. The core flux reset control circuit captures a high percentage of the energy that would otherwise be lost in the charge transfer process.

Further, one or more embodiments of the invention provide the capability of controlling the voltage applied to a transformer winding to reduce the magnetic flux in the transformer core. The core flux reset control circuit controls the voltage used to prevent saturation in the transformer core by supplying a controlled voltage and preventing voltage spikes. Without voltage spikes, circumstances such as overvoltage are avoided, which allows for the use of less expensive lower-voltage solid state devices instead of more expensive higher-voltage solid state devices.

Further, one or more embodiments of the invention provide the capability of achieving a duty cycle of that is very close to, but slightly less than, fifty percent. If the duty cycle is fifty percent or greater, then the performance of the charge transfer device may be degraded. Likewise, if the duty cycle is too close to zero, then the performance of the charge transfer device may be degraded.

Figure 8:
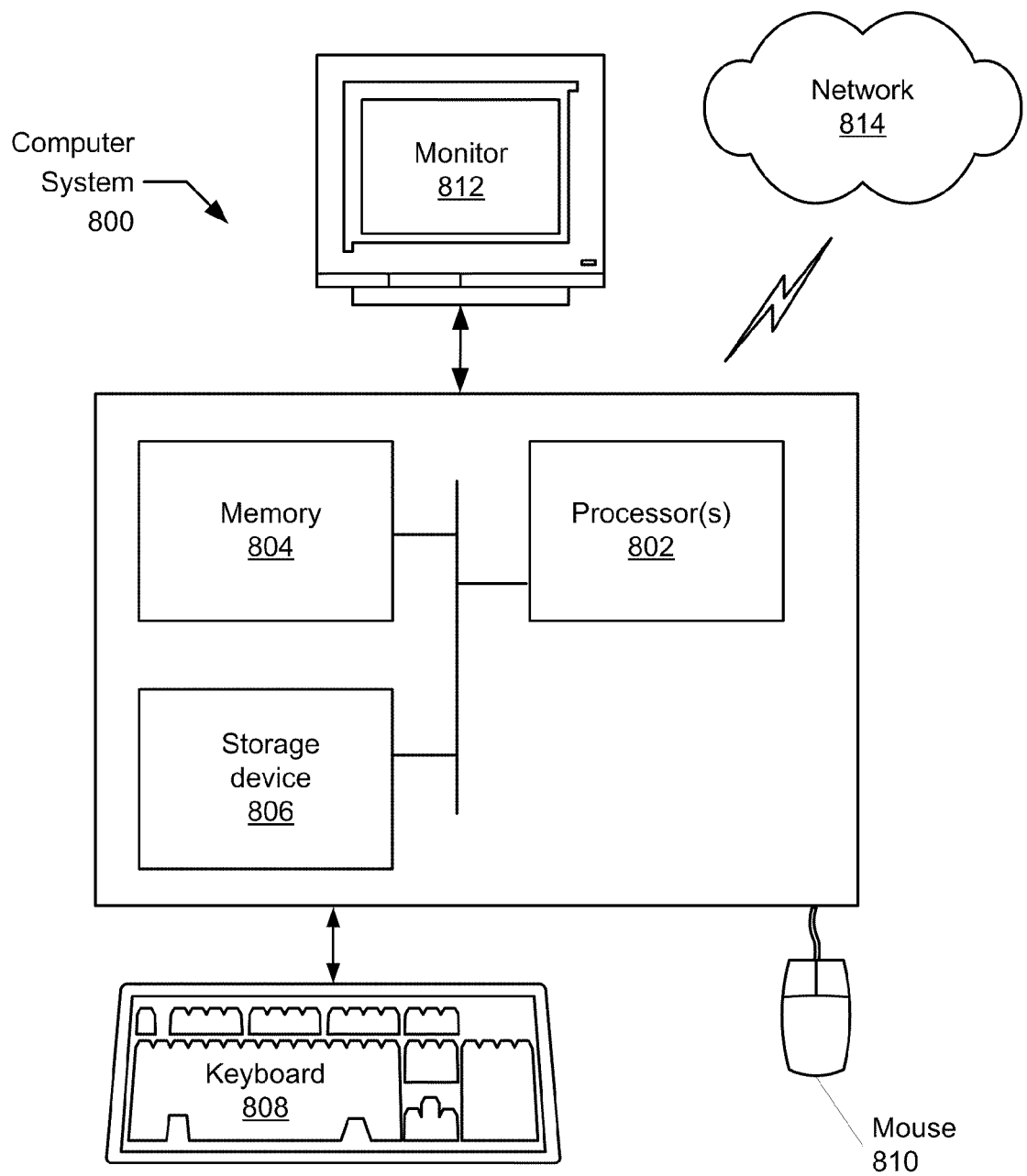
FIG. 8 shows a computer system in accordance with one or more embodiments of the invention.

Embodiments of the invention may be implemented using virtually any type of computer (e.g., DSP, FPGA, PLC) to control, for example, the various switches, regardless of the platform being used. For example, as shown in FIG. 8, a computer system (800) includes one or more processor(s) (802), associated memory (804) (e.g., random access memory (RAM), cache memory, flash memory, etc.), a storage device (806) (e.g., a hard disk, an optical drive such as a compact disk drive or digital video disk (DVD) drive, a flash memory stick, etc.), and numerous other elements and functionalities typical of today's computers (not shown). The computer (800) may also include input means, such as a keyboard (808), a mouse (810), or a microphone (not shown).

Further, the computer (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (800) includes at least the minimal processing, input, and/or output means necessary to practice embodiments of the invention.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention (e.g., data compression module, data decompression module) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for delivering a controlled voltage, the method comprising:
    during a first electric pulse of a plurality of electric pulses delivered to a primary transformer, holding a first switching section open to isolate the controlled voltage, wherein the first electric pulse creates a first magnetic flux in a core of the primary transformer, and wherein the first magnetic flux generates a direct current (DC) magnetizing current;
    receiving the controlled voltage from a voltage source using the DC magnetizing current at the first switching section; and
    upon termination of the first electric pulse, closing the first switching section to deliver the controlled voltage to the primary transformer,
    wherein an add-on transformer comprises a primary winding, a first secondary winding, and a second secondary winding,
    wherein the primary winding of the add-on transformer is connected to a secondary winding of the primary transformer,
    wherein the first secondary winding of the add-on transformer is configured to provide the DC magnetizing current to the voltage source, and
    wherein the second secondary winding is configured to provide power to control the first switching section.

2. The method of claim 1, wherein the voltage source is interconnected by an active solid-state circuit to the primary transformer, and wherein the active solid-state circuit is a bridge configuration with an active solid-state switch.

3. The method of claim 1, wherein a frequency of the plurality of electric pulses is greater than 1,000 Hertz.

4. The method of claim 1, wherein an integrated amount of the controlled voltage delivered to the primary transformer while the first switching section is closed is equal to an integrated amount of voltage delivered to the primary transformer during the first electric pulse.

5. The method of claim 1, wherein the primary transformer is configured to convert power from at least one of a group consisting of alternating current (AC) power and DC power to at least one of a group consisting of AC power and DC power.

6. The method of claim 1, wherein an amount of time to deliver the controlled voltage to the primary transformer is less than an amount of time between the termination of the first electric pulse and a start of a second electric pulse.

7. The method of claim 1, wherein delivery of the first electric pulse to the primary transformer comprises:
   closing a first input switch associated with a first input filter capacitor and a first input voltage;
   closing a second input switch associated with a second input filter capacitor and a second input voltage;
   charging a central capacitor using a first differential between the first input voltage and the second input voltage;
   when a charge of the central capacitor reaches a first predetermined level:
      closing a third input switch associated with a third input filter capacitor and a third input voltage; and
      charging the central capacitor using a second differential between the first input voltage and the third input voltage;
   when the charge of the central capacitor reaches a second predetermined level, closing a discharge switch; and
   discharging the central capacitor into the primary transformer.

8. The method of claim 7, wherein termination of the first electric pulse comprises:
   opening the discharge switch when the charge of the central capacitor reaches a third predetermined level.

9. A system for delivering a controlled voltage, the system comprising:
   a voltage source configured to provide a controlled voltage;
   a first secondary winding configured to:
      receive a first electric pulse of a plurality of electric pulses from an input module comprising a primary transformer, wherein the first electric pulse creates a first magnetic flux in a core of the primary transformer, and wherein the first magnetic flux generates a first direct current (DC) magnetizing current; and
      receive a second electric pulse of the plurality of electric pulses from the input module comprising the primary transformer, wherein the second electric pulse creates a second magnetic flux in the core of the primary transformer, and wherein the second magnetic flux generates a second DC magnetizing current,
      wherein the first electric pulse and the second electric pulse have the same polarity;
   a first switching section configured to:
      receive the controlled voltage from the voltage source;
   a control unit configured to control the first switching section;
   an add-on transformer comprising a primary winding, a first secondary winding, and a second secondary winding,
   wherein the primary winding of the add-on transformer is connected to a secondary winding of the primary transformer,
   wherein the first secondary winding of the add-on transformer is configured to provide the DC magnetizing current to the voltage source, and
   wherein the second secondary winding is configured to provide power to control the first switching section.

10. The system of claim 9, wherein the voltage source is interconnected by an active solid-state circuit to the primary transformer, and wherein the active solid-state circuit is a bridge configuration with an active solid-state switch.

11. The system of claim 9, wherein the first switching section is an insulated gate bipolar transistor.

12. The system of claim 9, wherein an integrated amount of the controlled voltage delivered to the primary transformer while the first switching section is closed is equal to an integrated amount of voltage delivered to the primary transformer during the first electric pulse.

13. The system of claim 9, wherein the primary transformer is configured to convert power from at least one of a group consisting of alternating current (AC) power and DC power to at least one of a group consisting of AC power and DC power.

14. The system of claim 9, wherein the input module further comprises:
   a first charging circuit comprising:
      a first input switch;
      an inductor;
      a central capacitor;
      a second input switch;
      a first input filter capacitor associated with a first input voltage and coupled with the first input switch; and
      a second input filter capacitor associated with a second input voltage and coupled with the second input switch,
      wherein when the first input switch and the second input switch are closed, the central capacitor is charged by applying a first differential between the first input voltage and the second input voltage;
   a second charging circuit comprising:
      the first input switch;
      the inductor;
      the central capacitor;
      a third input switch;
      the first input filter capacitor; and
      a third input filter capacitor associated with a third input voltage and coupled with the third input switch,
   wherein the third input switch closes when a charge of the central capacitor reaches a first predetermined level,
   wherein the third input switch opens when the charge of the central capacitor reaches a second predetermined level, and
   wherein the first input switch and the third input switch continue charging the central capacitor by applying a second differential between the first input voltage and the third input voltage.

15. The system of claim 14, further comprising:
   a discharge switch configured to:
      close when the charge of the central capacitor reaches the second predetermined level to permit the first electric pulse to flow from the central capacitor to the primary transformer; and
      open when the charge of the central capacitor reaches a third predetermined level to stop flow of the first electric pulse from the central capacitor to the primary transformer.

16. The system of claim 15, further comprising an output module comprising:
- a first discharging circuit comprising:
  - a first output switch associated with a first output voltage;
  - a second output switch associated with a second output voltage;
  - a first filter output capacitor coupled with the first output switch; and
  - a second filter output capacitor coupled with the second output switch,
  - wherein the first output switch and the second output switch are closed to begin discharging the central capacitor; and
- a second discharging circuit comprising:
  - the first output switch;
  - a third output switch associated with a third output voltage;
  - the first input filter capacitor; and
  - a third output filter capacitor associated with the third output switch,
  - wherein the third output switch closes when a discharge of the central capacitor reaches a third predetermined level, and
  - wherein the third output switch opens when the discharge of the central capacitor reaches a fourth predetermined level.

17. The system of claim 16, wherein the first output filter capacitor is the voltage source.

* * * * *